(12) United States Patent
Oshima et al.

(10) Patent No.: US 12,338,958 B2
(45) Date of Patent: Jun. 24, 2025

(54) GAS FILLING DEVICE

(71) Applicants: ENEOS Corporation, Tokyo (JP); Tokico System Solutions, Ltd., Kanagawa (JP)

(72) Inventors: Shinji Oshima, Chiyoda-ku (JP); Tatsuya Rembutsu, Kakegawa (JP)

(73) Assignees: ENEOS CORPORATION, Tokyo (JP); TOKICO SYSTEM SOLUTIONS, LTD., Kanagawa (JP)

( * ) Notice: Subject to any disclaimer, the term of this patent is extended or adjusted under 35 U.S.C. 154(b) by 160 days.

(21) Appl. No.: 18/278,471

(22) PCT Filed: Mar. 2, 2022

(86) PCT No.: PCT/JP2022/008835
§ 371 (c)(1),
(2) Date: Aug. 23, 2023

(87) PCT Pub. No.: WO2022/186268
PCT Pub. Date: Sep. 9, 2022

(65) Prior Publication Data
US 2024/0183496 A1 Jun. 6, 2024

(30) Foreign Application Priority Data
Mar. 3, 2021 (JP) ................. 2021-033609

(51) Int. Cl.
*F17C 5/00* (2006.01)
*F17C 5/06* (2006.01)
*F17C 13/02* (2006.01)

(52) U.S. Cl.
CPC ............ *F17C 5/007* (2013.01); *F17C 5/06* (2013.01); *F17C 13/025* (2013.01); *F17C 2221/012* (2013.01); *F17C 2223/0123* (2013.01)

(58) Field of Classification Search
CPC .......... F17C 5/007; F17C 5/06; F17C 13/025; F17C 2221/012; F17C 2223/0123;
(Continued)

(56) References Cited

U.S. PATENT DOCUMENTS 10,077,871 B2 * 9/2018 Blanchet .............. F17C 5/06
12,209,709 B2 * 1/2025 Sinding ............... F17C 5/06
(Continued)

FOREIGN PATENT DOCUMENTS

EP   3144577 A2 * 3/2017 ............ F17C 13/04
JP   2008-19996    1/2008
(Continued)

OTHER PUBLICATIONS

International Search Report Issued in International Patent Application No. PCT/JP2022/008835, dated Apr. 26, 2022, along with an English translation thereof.
(Continued)

*Primary Examiner* — Kenneth Rinehart
*Assistant Examiner* — Stephanie A Shrieves
(74) *Attorney, Agent, or Firm* — Greenblum & Bernstein, P.L.C.

(57) ABSTRACT

A gas filling device is provided with a first gas supply pipeline, a second gas supply pipeline, and an integrated control panel. The first gas supply pipeline supplies hydrogen gas from a multistage accumulator to a first filled tank mounted on a first vehicle. The second gas supply pipeline supplies hydrogen gas from the multistage accumulator to a second filled tank mounted on a second vehicle different from the first vehicle. At the time of filling the hydrogen gas into both of the first filled tank and the second filled tank from the multistage accumulator, the integrated control panel sets a pressure rise rate of the first filled tank or a pressure rise rate of the second filled tank to be lower than
(Continued)

a reference pressure rise rate in accordance with a difference in pressure between the first filled tank and the second filled tank.

8 Claims, 11 Drawing Sheets

(58) Field of Classification Search
CPC ...... F17C 2205/0142; F17C 2205/0326; F17C 2205/0338; F17C 2225/0123; F17C 2227/0157; F17C 2227/0337; F17C 2227/043; F17C 2250/03; F17C 2250/043; F17C 2265/065; F17C 2270/0178; F17C 2250/032; F17C 2250/0439; F17C 2250/0636; Y02E 60/32
USPC .......................................................... 141/4
See application file for complete search history.

(56) References Cited

U.S. PATENT DOCUMENTS

| 2003/0164202 A1* | 9/2003 | Graham ................... B60S 5/02 141/98 |
| 2008/0185068 A1 | 8/2008 | Cohen et al. |
| 2014/0352840 A1 | 12/2014 | Blanchet |
| 2016/0116113 A1* | 4/2016 | Mrowzinski ............ F17C 5/007 222/3 |
| 2017/0023180 A1 | 1/2017 | Petit et al. |
| 2017/0067600 A1* | 3/2017 | Poorman ................... F17C 5/06 |
| 2019/0086032 A1* | 3/2019 | Handa ....................... F17C 5/06 |
| 2020/0173607 A1 | 6/2020 | Mathison |
| 2021/0003253 A1* | 1/2021 | Thieu ....................... F17C 5/007 |
| 2021/0239272 A1 | 8/2021 | Rembutsu et al. |
| 2022/0193600 A1* | 6/2022 | Maehara ............ B01D 53/0407 |

FOREIGN PATENT DOCUMENTS

| JP | 2008019996 A | * | 1/2008 | ........... G02B 6/4295 |
| JP | 2016-526136 | | 9/2016 | |
| JP | 2018-84328 | | 5/2018 | |
| JP | 2018-84329 | | 5/2018 | |
| JP | 2018084329 A | * | 5/2018 | |
| JP | 2019-190621 | | 10/2019 | |

OTHER PUBLICATIONS

Written Opinion of the International Searching Authority for International Patent Application No. PCT/JP2022/008835, dated Apr. 26, 2022, along with an English translation thereof.

* cited by examiner a: SIMULTANEOUS FILLING START  c: SECOND PRESSURE RISE RATE APRR2.B
b: PRESSURE RISE RATE APRR.A    d: ORIGINAL PRESSURE RISE RATE APRR.B
f: PRESSURE RISE RATE APRR.B    g: FILLING SPEED CHANGE

GAS FILLING DEVICE

TECHNICAL FIELD

The present invention relates to gas filling devices, for example, to a gas filling device that fills (supplies) fuel gas such as hydrogen gas to a filled tank mounted on a vehicle.

BACKGROUND ART

Patent Document 1 describes a fuel gas filling control system that is provided with a filling path (gas supply path) for connection between a filling nozzle installed in a filling device and an accumulator to fill (supply) fuel gas (hydrogen gas) stored in the accumulator via the filling nozzle into a tank (a filled tank) mounted on a vehicle. The fuel gas filling control system according to Patent Document 1 is configured to control, at the time of filling the fuel gas into the tank mounted on the vehicle, a pressure rise rate in the fuel gas so that the pressure in the tank becomes a target completion pressure set in accordance with the pressure at that time in the tank mounted on the vehicle. In addition, Patent Documents 2 and 3 each describe a hydrogen supply system provided with a multistage accumulator configured of a plurality of accumulators.

PRIOR ART DOCUMENT

Patent Document

Patent Document 1: Japanese Patent Laid-Open No. 2019-190621 A
Patent Document 2: Japanese Patent Laid-Open No. 2018-084328 A
Patent Document 3: Japanese Patent Laid-Open No. 2018-084329 A

SUMMARY OF THE INVENTION

It is conceived that a fuel gas filling control system is configured to fill a plurality of filled tanks with fuel gas. That is, it is conceived that the fuel gas filling control system is configured with a plurality of filling paths and an accumulator shared with the plurality of filling paths, for example. To be more specific, the fuel gas filling control system is configured to be provided with, for example, "a first filling path and a first filling nozzle connected to the first filling path", and "a second filling path branched from the first filling path" and "a second filling nozzle connected to the second filling path". Furthermore, the accumulator can be shared with the first filling path and the second filling path to fill the fuel gas into the plurality of filled tanks in parallel.

According to the configuration as mentioned above, the second filled tank can be filled with the fuel gas via the second filling path while the first filled tank is being filled with the fuel gas via the first filling path. In this case, however, for example, depending upon a relationship between pressures in both of the filled tanks at the time of starting the filling of the fuel gas thereinto, there is a possibility that the pressure in the tank that is higher in pressure (on the higher pressure side) becomes difficult to rise. That is, depending upon a relationship of a pressure in the accumulator, a pressure in the first filled tank and a pressure in the second filled tank at the time of starting the filling of the fuel gas thereinto, there is a possibility that the pressure in the tank that is higher in pressure (on the higher pressure side) becomes difficult to rise. As a result, there is a possibility that a time until the filling completion of the tank on the higher pressure side becomes longer or the filling ends halfway.

An object of an aspect in the present invention is to provide a gas filling device that can suppress a time until the filling completion of a tank on the higher pressure side from becoming longer or the filling from ending halfway at the time of filling (supplying) fuel gas into a plurality of tanks from an accumulator.

A gas filling device according to an aspect of the present invention comprises: a first gas supply path for supplying fuel gas into a first filled tank from an accumulator in which the fuel gas is accumulated; a second gas supply path for supplying the fuel gas into a second filled tank from the accumulator; and a control device configured to control a pressure rise rate of the fuel gas to be supplied via the first gas supply path into the first filled tank and control a pressure rise rate of the fuel gas to be supplied via the second gas supply path into the second filled tank, characterized in that when supplying the fuel gas into both of the first filled tank and the second filled tank from the accumulator, the control device sets a pressure rise rate of the first filled tank or a pressure rise rate of the second filled tank to be lower than a reference pressure rise rate in accordance with a difference in pressure between the first filled tank and the second filled tank.

According to the aspect of the present invention, it is possible to suppress the time until the supply (filling) of the fuel gas into the filled tank on the higher pressure side is completed from becoming longer or the supply (filling) of the fuel gas from ending halfway at the time of supplying (filling) the fuel gas into the plurality of filled tanks (the first filled tank and the second filled tank) from the accumulator.

BRIEF DESCRIPTION OF THE DRAWINGS

FIG. 1 is an overall configuration diagram schematically showing a gas filling device according to a first embodiment together with an accumulator, a compressor and the like.

MODE FOR EXECUTING THE INVENTION

Figure 1:
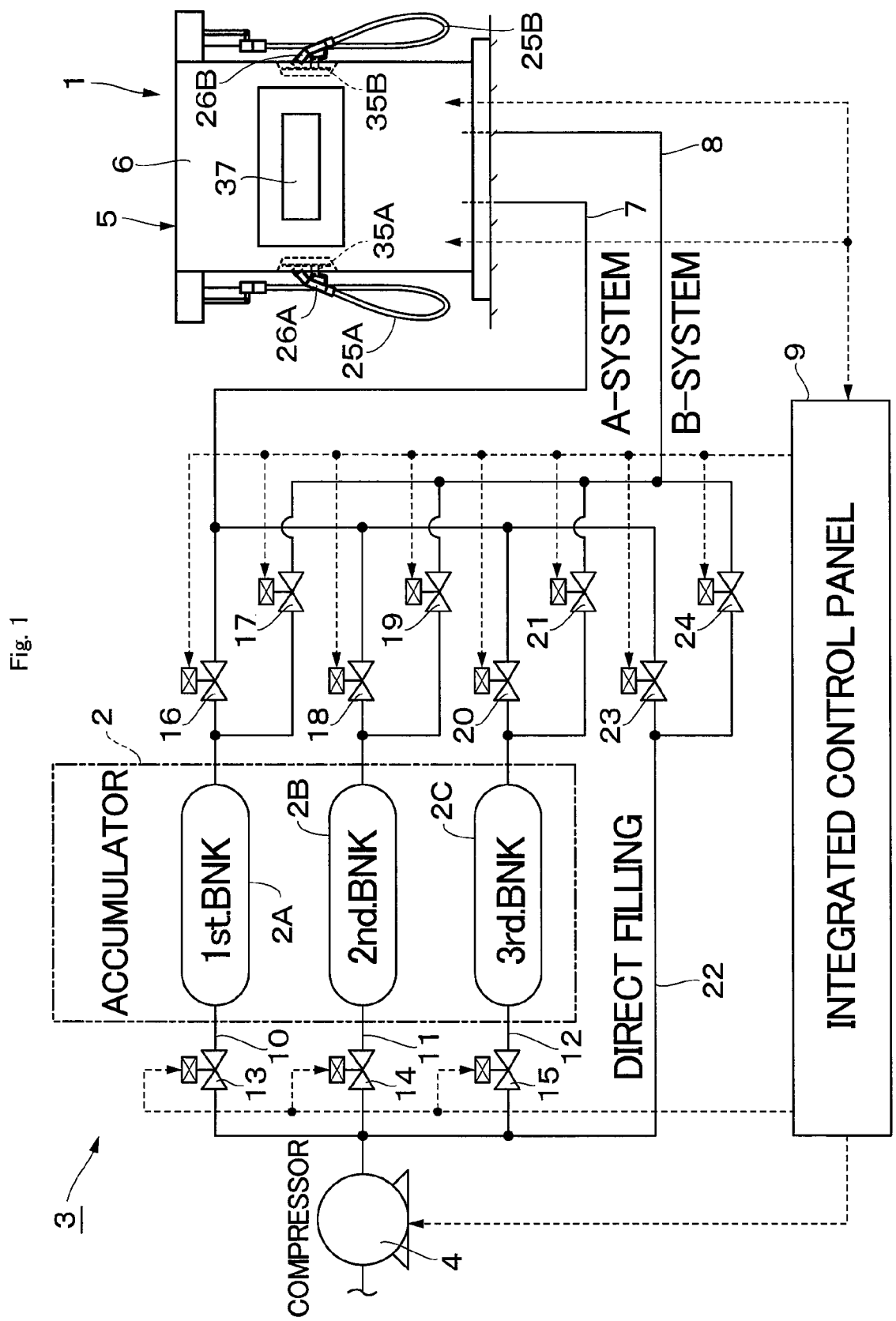

Hereinafter, gas filling devices according to embodiments will be described in detail with reference to the accompanying drawings by taking a hydrogen gas filling device for filling hydrogen gas into a filled tank mounted on a vehicle as an example thereof. It should be noted that each step of flow charts as shown in FIG. 3 to FIG. 7 is indicated by using notation of "S" (for example, step 1="S1").

FIG. 1 to FIG. 8 show a first embodiment. A hydrogen gas filling device 1 in FIG. 1 and FIG. 2 fills compressed hydrogen gas (hydrogen fuel) into filled tanks 53, 54 (FIG. 2) mounted on vehicles 51, 52 (FIG. 2) such as fuel cell vehicles (FCV). The hydrogen gas filling device 1 is installed in a facility (fuel supply facility) called a hydrogen gas supply station (hydrogen station). The hydrogen gas filling device 1 configures a part of a hydrogen fuel supply system 3 together with a multistage accumulator 2 as a gas accumulator and the like.

That is, the hydrogen fuel supply system 3 is configured to include the hydrogen gas filling device 1, the multistage accumulator 2 and a compressor 4. The hydrogen gas filling device 1 fills hydrogen gas (fuel gas) into the filled tanks 53, 54 as fuel tanks for the vehicles 51, 52. The multistage accumulator 2 accumulates therein hydrogen gas compressed to a high pressure. The compressor 4 compresses hydrogen gas. The hydrogen gas filling device 1 is configured to include a dispenser unit 5 as a filling mechanism, gas supply pipelines 7, 8 and an integrated control panel 9 as a control device. The dispenser unit 5 fills the hydrogen gas in the multistage accumulator 2 into the filled tanks 53, 54 mounted on the vehicles 51, 52. The gas supply pipelines 7, 8 extend from the multistage accumulator 2 into a dispenser housing 6 of the dispenser unit 5. The integrated control panel 9 controls the supply (filling) of the hydrogen gas from the multistage accumulator 2 into the filled tanks 53, 54 mounted on the vehicles 51, 52.

In the embodiment, the integrated control panel 9 executes control of the supply (filling) of the hydrogen gas from the multistage accumulator 2 into the filled tanks 53, 54 mounted on the vehicles 51, 52, and furthermore, executes control of the supply (accumulation) of the hydrogen gas from a later-described hydrogen supply source into the multistage accumulator 2. That is, in the embodiment, the integrated control panel 9 executes the control (vehicle filling control) of the supply (filling) of the hydrogen gas from the multistage accumulator 2 into the filled tanks 53, 54 mounted on the vehicles 51, 52, and the control (accumulation control) of the supply (accumulation) of the hydrogen gas from the unillustrated hydrogen supply source into the multistage accumulator 2. However, not limited thereto, for example, a control panel (a control device for filling and a filling control unit) for executing a vehicle filling control and a control panel (a control device for accumulation and an accumulator control unit) for executing accumulation control may be individually configured, wherein these control panels (control devices) may be connected by communication lines. In this case, for example, the control panel (the control device for filling and the filling control unit) for executing the vehicle filling control may be disposed inside of the dispenser housing 6.

The multistage accumulator 2 is a supply source of hydrogen gas (fuel gas) for storing the hydrogen gas compressed to a high pressure. That is, the hydrogen gas as fuel gas is stored in the multistage accumulator 2. The multistage accumulator 2 is connected to the dispenser unit 5 by the gas supply pipelines 7, 8. The multistage accumulator 2 forms gas storage parts in the upstream side of the hydrogen gas supply pipelines 7, 8 for storing the hydrogen gas compressed to the high pressure. The multistage accumulator 2 is configured of a plurality of accumulators 2A, 2B, 2C to set a use lower limit pressure in multiple stages, that is, is configured of the first accumulator 2A, the second accumulator 2B and the third accumulator 2C. The first accumulator 2A, the second accumulator 2B and the third accumulator 2C are configured by gas bombs (gas containers or gas cylinders) respectively.

In the embodiment, the first accumulator 2A corresponds to a low pressure bank (first BNK, low pressure accumulator) that is used until the use lower limit pressure becomes the lowest. The second accumulator 2B corresponds to an intermediate pressure bank (second BNK, intermediate pressure accumulator) of which the use lower limit pressure becomes intermediate. The third accumulator 2C corresponds to a high pressure bank (third BNK, high pressure accumulator) of which the use lower limit pressure becomes high. It should be noted that in the embodiment, the multistage accumulator 2 includes the three accumulators 2A, 2B, 2C, but may include two, four or more accumulators. In addition, not the multistage accumulator 2 including the plurality of accumulators 2A, 2B, 2C, but a single accumulator may be adopted.

The high pressure hydrogen gas is supplied from the unillustrated hydrogen supply source via the compressor 4 to the multistage accumulator 2. That is, the multistage accumulator 2 is connected via the compressor 4 to the hydrogen supply source. An openable/closable valve, a check valve and the like, which are not shown, are arranged in a pipeline for connection between a discharge side of the hydrogen supply source and the compressor 4. The hydrogen supply source corresponds to a curdle as a collective entity of gas containers (cylinders) into which hydrogen gas is filled, an intermediate accumulator having a large capacity for storing hydrogen gas, a hydrogen manufacturing device for manufacturing hydrogen gas, and/or a hydrogen trailer for filling therein hydrogen for delivery. The hydrogen gas in the hydrogen supply source is pressurized by the compressor 4, which is stored under pressure in the multistage accumulator 2.

The compressor 4 as a compressor (booster) is configured of a reciprocal compressor, for example. The compressor 4 may be configured as a multistage compressor that compresses hydrogen gas in a plurality of stages, for example. A discharge side of the compressor 4 is connected to the first accumulator 2A of the multistage accumulator 2 by a first pipeline 10. The first pipeline 10 is provided with a first openable/closable valve 13 therein. In addition, a discharge side of the compressor 4 is connected to the second accumulator 2B of the multistage accumulator 2 by a second pipeline 11. The second pipeline 11 is provided with a second openable/closable valve 14 therein. Furthermore, a discharge side of the compressor 4 is connected to the third accumulator 2C of the multistage accumulator 2 by a third pipeline 12. The third pipeline 12 is provided with a third openable/closable valve 15 therein. The first openable/closable valve 13, the second openable/closable valve 14 and the third openable/closable valve 15 open/close based upon control signals from the integrated control panel 9. As a result, the first openable/closable valve 13, the second openable/closable valve 14 and the third openable/closable valve 15 allow or block circulation of the hydrogen gas in the respective pipelines 10, 11, 12.

The hydrogen gas in the hydrogen supply source is reduced to a low pressure (for example, 0.6 MPa) by an unillustrated regulator and in that state, is supplied to a suction side of the compressor 4, for example. The compressor 4 is connected to the integrated control panel 9. The compressor 4, based upon commands from the integrated control panel 9, supplies the hydrogen gas to be supplied at a low pressure from the hydrogen supply source to each of the accumulators 2A, 2B, 2C of the multistage accumulator 2 while compressing it. The compressor 4 compresses the hydrogen gas until a pressure within each of the accumulators 2A, 2B, 2C of the multistage accumulator 2 reaches a certain high pressure (for example, 82 MPa). In other words, the compressor 4 compresses the hydrogen gas until the pressure in the discharge side becomes the certain high pressure (for example, 82 MPa). Which one of the accumulators 2A, 2B, 2C the hydrogen gas is supplied into from the compressor 4 is determined by controlling the opening/closing of the openable/closable valves 13, 14, 15 by the integrated control panel 9. In this case, the openable/closable valves may be controlled so that the hydrogen gas is supplied to one accumulator from the compressor 4 or the openable/closable valves may be controlled so that the hydrogen gas is supplied to two or more accumulators from the compressor 4 at the same time.

Figure 2:
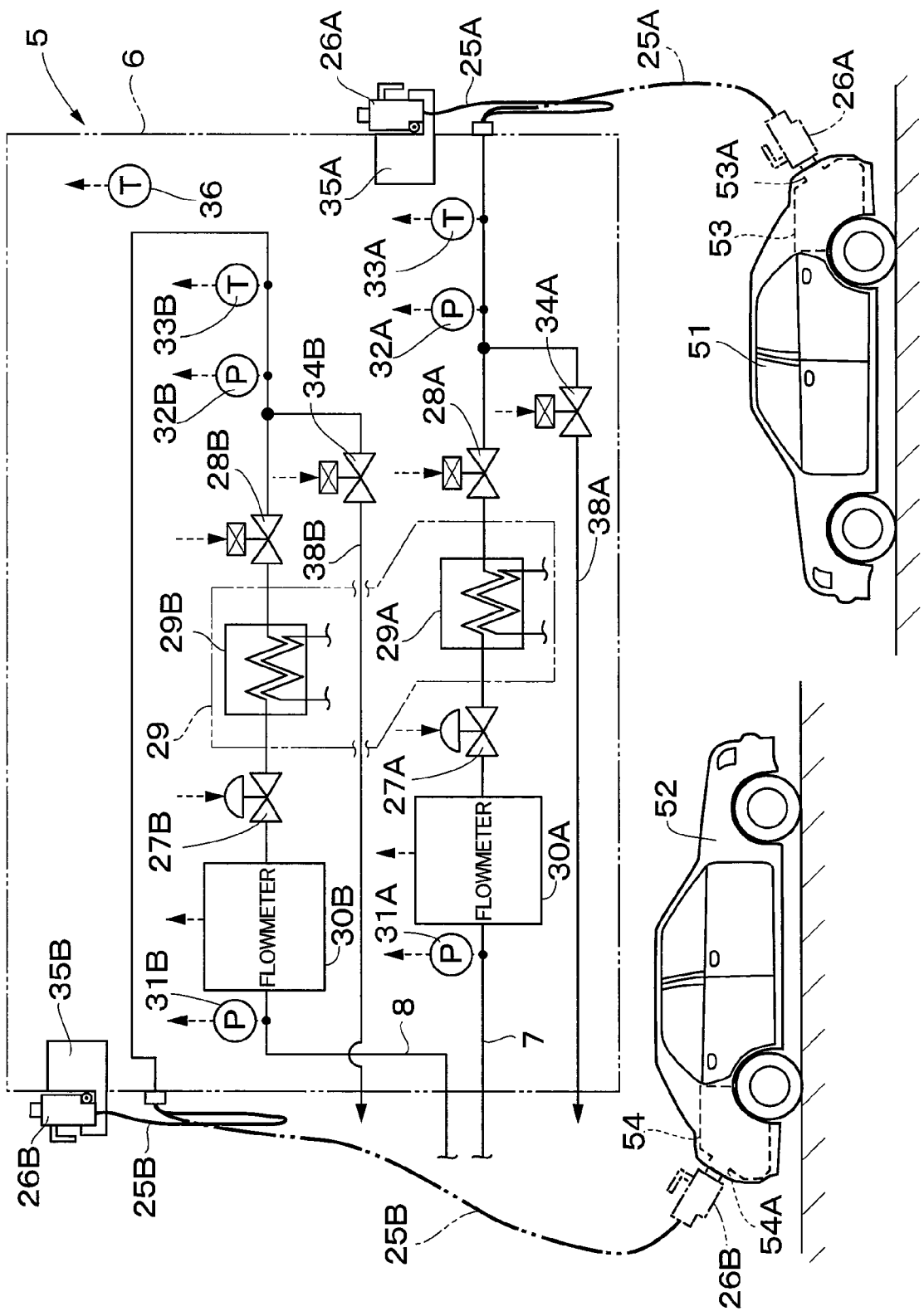
FIG. 2 is a configuration diagram schematically showing the gas filling device in FIG. 1.

The multistage accumulator 2 is connected to the two gas supply pipelines 7, 8, that is, the first gas supply pipeline 7 corresponding to A-system (first gas supply path) and the second gas supply pipeline 8 corresponding to B-system (second gas supply path). As shown in FIG. 1, the gas supply pipelines 7, 8 extend from the multistage accumulator 2 toward the dispenser unit 5. As shown in FIG. 2, the gas supply pipelines 7, 8 are arranged within the dispenser housing 6 of the dispenser unit 5. The gas supply pipelines 7, 8 are connected via filling nozzles 26A, 26B of the dispenser unit 5 to the filled tanks 53, 54 mounted on the vehicles 51, 52.

As shown in FIG. 1, each of the accumulators 2A, 2B, 2C in the multistage accumulator 2 is connected to both of the first gas supply pipeline 7 and the second gas supply pipeline 8. In this case, the first accumulator 2A is connected via a fourth openable/closable valve 16 to the first gas supply pipeline 7 and via a fifth openable/closable valve 17 to the second gas supply pipeline 8. The second accumulator 2B is connected via a sixth openable/closable valve 18 to the first gas supply pipeline 7 and via a seventh openable/closable valve 19 to the second gas supply pipeline 8. The third accumulator 2C is connected via an eighth openable/closable valve 20 to the first gas supply pipeline 7 and via a nineth openable/closable valve 21 to the second gas supply pipeline 8. In the embodiment, the accumulator for accumulating the hydrogen gas under pressure includes the plurality of accumulators 2A, 2B, 2C and is formed as the common multistage accumulator 2 connected to both of the first gas supply pipeline 7 and the second gas supply pipeline 8.

A direct filling pipeline 22 is connected to the first gas supply pipeline 7 and the second gas supply pipeline 8 so that the hydrogen pressurized by the compressor 4 can be supplied directly to the dispenser unit 5-side based upon a direct filling request from the dispenser unit 5-side. The first gas supply pipeline 7 and the second gas supply pipeline 8 are connected directly via the direct filling pipeline 22 bypassing the multistage accumulator 2 to the compressor 4. The direct filling pipeline 22 is connected via a tenth openable/closable valve 23 to the first gas supply pipeline 7 and via an eleventh openable/closable valve 24 to the second gas supply pipeline 8.

Thus, in the embodiment, the hydrogen can be supplied individually to A-system (first gas supply pipeline 7) and B-system (second gas supply pipeline 8) of the dispenser unit 5 from the multistage accumulator 2 and the compressor 4. That is, in the hydrogen gas supply station according to the embodiment the multistage accumulator 2 and the compressor 4 are shared in the plurality of gas supply pipelines 7, 8. It should be noted that the dispenser unit 5 in the embodiment is configured as a double-type dispenser unit in which the two systems are united. However, not limited thereto, for example, the dispenser unit may be configured to be provided with, for example, two single-type dispenser units each of which operates independently to each other, that is, to be provided with a dispenser unit of A-system and a dispenser unit of B-system.

Here, an explanation will be made of the switching between the respective accumulators 2A, 2B, 2C at the time of supplying (filling) the hydrogen gas into the filled tank 53 mounted on the vehicle 51 via A-system (first gas supply pipeline 7) of the dispenser unit 5 from the multistage accumulator 2. As described later, in a state where the filling nozzle 26A is connected to the filled tank 53 mounted on the vehicle 51, the supply of the hydrogen gas is started to the filled tank 53 mounted on the vehicle 51 from the multistage accumulator 2. At this time, for example, when the fourth openable/closable valve 16 opens from a state where all of the openable/closable valves 13, 14, 15, 16, 17, 18, 19, 20, 21, 23, 24 are closed, the supply of the hydrogen gas is started to the filled tank 53 from the first accumulator 2A as the low pressure bank (low pressure accumulator). When the fourth openable/closable valve 16 opens, the hydrogen gas stored under pressure within the first accumulator 2A moves to the filled tank 53-side based upon a difference in pressure between the first accumulator 2A and the filled tank 53 to gradually increase the pressure in the filled tank 53. This increase gradually lowers the pressure within the first accumulator 2A.

Figure 8:
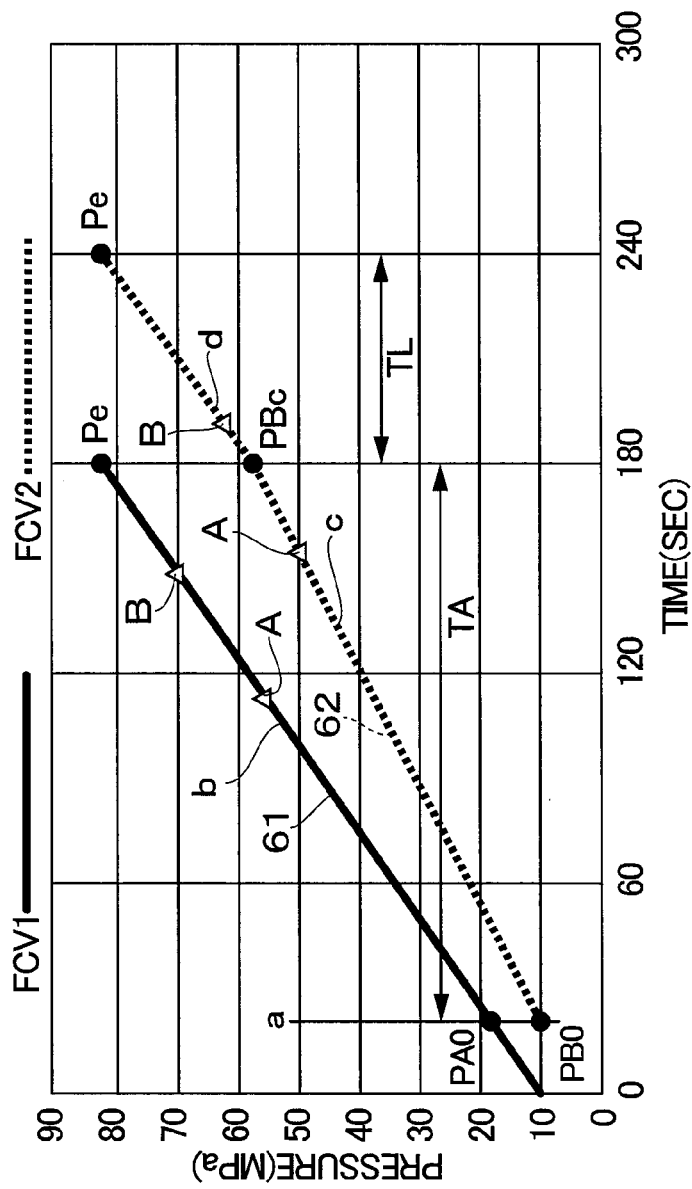
FIG. 8 is a characteristic diagram showing an example of a time change in pressure of a first filled tank and an example of a time change in pressure of a second filled tank according to the first embodiment.

A characteristic line 61 in FIG. 8 shows an example of a time change in pressure of the filled tank 53 mounted on the vehicle 51. When the pressure in the filled tank 53 gradually rises to reach a certain pressure (for example, A point in FIG. 8), the fourth openable/closable valve 16 closes and the sixth openable/closable valve 18 opens. Because of this, the supply of the hydrogen gas from the first accumulator 2A is stopped and the supply of the hydrogen gas is started into the filled tank 53 from the second accumulator 2B as the intermediate pressure bank (intermediate accumulator). That is, the accumulator for supplying the hydrogen gas to the filled tank 53 is switched from the first accumulator 2A to the second accumulator 2B. "A" in FIG. 8 corresponds to a point where the switching between the accumulators 2A, 2B, 2C to be connected to the filled tank 53 is made.

When the sixth openable/closable valve 18 opens, the hydrogen gas stored under pressure within the second accumulator 2B moves to the filled tank 53-side based upon a difference in pressure between the second accumulator 2B and the filled tank 53 to continually increase the pressure in the filled tank 53. This continual increase gradually lowers the pressure within the second accumulator 2B. In addition, when the pressure in the filled tank 53 reaches a certain pressure (for example, B point in FIG. 8), the sixth openable/closable valve 18 closes and the eighth openable/closable valve 20 opens. Because of this, the supply of the hydrogen gas from the second accumulator 2B is stopped and the supply of the hydrogen gas is started into the filled tank 53 from the third accumulator 2C as the high pressure bank (high pressure accumulator). That is, the accumulator for supplying the hydrogen gas into the filled tank 53 is switched from the second accumulator 2B to the third accumulator 2C.

When the eighth openable/closable valve 20 opens, the hydrogen gas stored under pressure within the third accumulator 2C moves to the filled tank 53-side based upon a difference in pressure between the third accumulator 2C and the filled tank 53 to further increase the pressure in the filled tank 53. Because of this, the pressure within the third accumulator 2C is gradually lowered. In addition, when the pressure in the filled tank 53 reaches a target completion pressure (Pe) for stopping the supply of the hydrogen gas, the eighth openable/closable valve 20 closes to stop the supply of the hydrogen gas from the third accumulator 2C. Because of this, the supply of the hydrogen gas into the filled tank 53 mounted on the vehicle 51 from the multistage accumulator 2 ends. In this way, in a case of adopting the configuration for sequentially switching the accumulators 2A, 2B, 2C to be used in the supply of the hydrogen gas, a difference between the pressure of each of the accumulators 2A, 2B, 2C and the pressure of the filled tank 53 mounted on the vehicle 51 can be kept to be large. As a result, the time until completion of the supply of the hydrogen gas can be made short.

Next, an explanation will be made of the dispenser unit 5 by referring to FIG. 2. It should be noted that FIG. 2 shows a state of supplying (filling) the hydrogen gas to the two vehicles 51, 52. That is, FIG. 2 shows a state of supplying (filling) the hydrogen gas into the filled tank 53 mounted on the vehicle 51 by A-system (first gas supply pipeline 7) and supplying (filling) the hydrogen gas into the filled tank 54 mounted on the vehicle 52 by B-system (second gas supply pipeline 8). The dispenser unit 5 in the embodiment is provided with gas supply paths (fuel supply paths) in two systems. Therefore, the dispenser unit 5 in the embodiment can be used in the two vehicles 51, 52 and also in the single vehicle 51 (or vehicle 52).

It should be noted that in the following explanation, the vehicle 51 into which the hydrogen gas is supplied through A-system (first gas supply pipeline 7) is defined as the first vehicle 51, and the vehicle 52 into which the hydrogen gas is supplied through B-system (second gas supply pipeline 8) is defined as the second vehicle 52. This is only because one (for example, A-system) of the two systems is defined conveniently as "first" and the other system (for example, B-system) is defined conveniently as "second". Therefore, for example, one system may be defined as B-system ("second") and the other system may be defined as A-system ("first"). In addition, in the flow charts in FIG. 3 to FIG. 7 to be described later, "DSP-A" corresponds to A-system (first) and "DSP-B" corresponds to B-system (second). "DSP" is abbreviation of "dispenser".

As shown in FIG. 2, the dispenser unit 5 includes the dispenser housing 6, the filling hoses 25A, 25B, the filling nozzles 26A, 26B, flow rate adjusting valves 27A, 27B, cutoff valves 28A, 28B, a cooler 29 (heat exchangers 29A, 29B), flowmeters 30A, 30B, primary pressure sensors 31A, 31B, secondary pressure sensors 32A, 32B, temperature sensors 33A, 33B, depressurization valves 34A, 34B, nozzle retainers 35A, 35B and an outside air temperature sensor 36. In FIG. 2, in regard to components provided within the dispenser unit 5, "A" is attached as an index of a code to components concerning to A-system (first gas supply pipeline 7) and "B" is attached as an index of a code to components concerning to B-system (second gas supply pipeline 8). In addition, omitted in illustration, but the dispenser unit 5 is provided with switches for executing an operation of start/stop of the filling, that is, a filling start switch and a filling stop switch for A-system, and a filling start switch and a filling stop switch for B-system.

As shown in FIG. 1, the dispenser housing 6 configures a building as an outer shape of the dispenser unit 5. The dispenser housing 6 is formed in a rectangular shape to be longer in the upper-lower direction, for example. As shown in FIG. 2, the gas supply pipelines 7, 8, the flow rate adjusting valves 27A, 27B, the cutoff valves 28A, 28B, the cooler 29 (heat exchangers 29A, 29B), the primary pressure sensors 31A, 31B, the secondary pressure sensors 32A, 32B, the temperature sensors 33A, 33B, and the like are accommodated within the dispenser housing 6. A display part 37 (FIG. 1) composed of a crystal monitor, a crystal touch panel and the like is disposed in the dispenser housing 6 in an easily visible position by a worker (staff member) for executing the filling work of the hydrogen gas or by a user (customer).

As shown in FIG. 1 and FIG. 2, the first nozzle retainer 35A on which the first filling nozzle 26A is removably retained and the second nozzle retainer 35B on which the second filling nozzle 26B is removably retained are arranged outside of the dispenser housing 6. The nozzle retainers 35A, 35B correspond to retaining parts for retaining the filling nozzles 26A, 26B. In the embodiment, the configuration (double-type dispenser unit) including the plurality of filling nozzles 26A, 26B (specifically, two) in the one dispenser unit 5 is explained as an example, but for example, the configuration (single-type dispenser unit) including one filling nozzle in one dispenser unit may be adopted. In addition, for example, the configuration including three or more filling nozzles in one dispenser unit may be adopted.

As shown in FIG. 2, the gas supply pipelines 7, 8 are arranged within the dispenser housing 6. The gas supply pipelines 7, 8 supply the pressurized hydrogen gas from the multistage accumulator 2 toward the filling hoses 25A, 25B-side. Therefore, the gas supply pipelines 7, 8 have the upstream sides connected to the multistage accumulator 2 and the downstream sides connected to the filling hoses 25A, 25B extending to the exterior of the dispenser housing 6. That is, the upstream sides of the gas supply pipelines 7, 8 are positioned closer to the multistage accumulator 2 and the downstream sides thereof are positioned closer to the filling hoses 25A, 25B. The filling hoses 25A, 25B each are formed with a pressure tight hose having flexibility. In the embodiment, the first gas supply pipeline 7 and the first filling hose 25A correspond to the first gas supply path (A-system), and the second gas supply pipeline 8 and the second filling hose 25B correspond to the second gas supply path (B-system).

The filling hoses 25A, 25B have the base end sides connected to the downstream sides of the gas supply pipelines 7, 8. That is, the first filling hose 25A has the base end side connected to the downstream side of the first gas supply pipeline 7, and the second filling hose 25B has the base end side connected to the downstream side of the second gas supply pipeline 8. The first filling nozzle 26A to be connected to the first filled tank 53 mounted on the first vehicle 51 is disposed on a tip end of the first filling hose 25A. The second filling nozzle 26B to be connected to the second filled tank 54 mounted on the second vehicle 52 is disposed on a tip end of the second filling hose 25B. The filling hoses 25A, 25B configure a hydrogen gas filling path (fuel gas filling path) together with the gas supply pipelines 7, 8. The hydrogen gas filling path is a path (pipeline) for filling the hydrogen gas into the filled tanks 53, 54 mounted on the vehicles 51, 52 travelling using the hydrogen gas as fuel.

The filling nozzles 26A, 26B are connected via the filling hoses 25A, 25B to the downstream sides of the gas supply pipelines 7, 8. The filling nozzles 26A, 26B are respectively connected to the tip end sides of the filling hoses 25A, 25B in an airtight state, which forms so-called filling couplings. The filling nozzles 26A, 26B are connected via the filling hoses 25A, 25B to the dispenser housing 6 (more specifically, the gas supply pipelines 7, 8). A valve portion is disposed in each of the filling nozzles 26A, 26B, the valve portion being switched to "an open position" allowing the circulation of the hydrogen gas and "a closed position" blocking the circulation of the hydrogen gas.

A tip end side of each of the filling nozzles 26A, 26B is formed as a connection coupler and is removably connected to each of filling ports 53A, 54A as connection ports of the filled tanks 53, 54. That is, the connection couplers of the filling nozzles 26A, 26B are removably connected to the filling ports 53A, 54A of the filled tanks 53, 54 in the airtight state at the time of supplying the hydrogen gas through pipelines (not shown) within the filling nozzles 26A, 26B into the filled tanks 53, 54 mounted on the vehicles 51, 52. In addition, the filling nozzles 26A, 26B are provided with lock mechanisms (not shown) to be locked to be engageable/ disengageable to the filling ports 53A, 54A of the filled tanks 53, 54. This configuration can suppress the filling nozzles 26A, 26B from being inadvertently out of the filling ports 53A, 54A at the filling time of the hydrogen gas.

The high pressure hydrogen gas in the multistage accumulator 2 is filled through the gas supply pipelines 7, 8, the filling hoses 25A, 25B and the filling nozzles 26A, 26B into the filled tanks 53, 54 mounted on the vehicles 51, 52 in a state where the filling nozzles 26A, 26B are locked to the filling ports 53A, 54A of the filled tanks 53, 54 by the lock mechanisms. That is, the hydrogen gas filling device 1 is provided with the filling nozzles 26A, 26B. The hydrogen gas filling device 1 uses the filling nozzles 26A, 26B to fill the hydrogen gas into the filled tanks 53, 54 mounted on the vehicles 51, 52. The filling nozzles 26A, 26B are retained by the nozzle retainers 35A, 35B when the filling work is not executed.

As shown in FIG. 2, the flow rate adjusting valves 27A, 27B as control valves for adjustably controlling a flow rate of fuel flowing in the gas supply pipelines 7, 8 are arranged in the middle of the gas supply pipelines 7, 8. In addition, the cutoff valves 28A, 28B are arranged in the middle of the gas supply pipelines 7, 8 to be in a position closer to the downstream side than the flow rate adjusting valves 27A, 27B. The flow rate adjusting valves 27A, 27B and the cutoff valves 28A, 28B configure control equipment for controlling a flow rate and a pressure of hydrogen gas flowing in the gas supply pipelines 7, 8. The flowmeters 30A, 30B, the primary pressure sensors 31A, 31B, the secondary pressure sensors 32A, 32B and the temperature sensors 33A, 33B configure measurement equipment for measuring a flow rate, a pressure and a temperature of hydrogen gas flowing in the gas supply pipelines 7, 8. It should be noted that the arrangement (sequence) of the flowmeters 30A, 30B, the flow rate adjusting valves 27A, 27B, the cutoff valves 28A, 28B arranged from the upstream side toward the downstream side of the gas supply pipelines 7, 8 are not limited to the sequence as shown in FIG. 2.

The flow rate adjusting valves 27A, 27B control the circulation of the hydrogen gas into the filled tanks 53, 54 mounted on the vehicles 51, 52. The flow rate adjusting valves 27A, 27B are, for example, pneumatic operational valve devices, which open by supply of air and a valve opening of which is adjusted by controlling a control pressure (air pressure) in response to a control signal. The flow rate adjusting valves 27A, 27B each are controlled to an optional valve opening with a command based upon a control program of the integrated control panel 9 as a control apparatus to variably control a flow rate and a hydrogen gas pressure of hydrogen gas flowing in the gas supply pipelines 7, 8. The cutoff valves 28A, 28B each are an electromagnetic or a pneumatic operational valve device arranged in the middle part (for example, between the heat exchangers 29A, 29B and the secondary pressure sensors 32A, 32B) of the gas supply pipelines 7, 8. The cutoff valves 28A, 28B are opened/closed based upon control signals from the integrated control panel 9 to allow or block the circulation of the hydrogen gas (fuel gas or filling gas) within the gas supply pipelines 7, 8. It should be noted that the control apparatus is not limited to an apparatus that integrally executes the controls of the respective equipment devices. For example, the control apparatus may be provided with a plurality of control units (control devices) composed of a filling control unit that is disposed within a dispenser housing to execute control of the filling, an accumulator control unit that executes control of an openable/closable valve of an accumulator, and the like, wherein the plurality of control units (control devices) may integrally be controlled by the control apparatus.

The integrated control panel 9 executes the openable/ closable valve control of the flow rate adjusting valves 27A, 27B and the cutoff valves 28A, 28B when filling the hydrogen gas via the filling nozzles 26A, 26B into the filled tanks 53, 54 mounted on the vehicles 51, 52 or stopping (completing) the filling of the hydrogen gas. The flow rate adjusting valves 27A, 27B and the cutoff valves 28A, 28B are arranged in the middle of the gas supply pipelines 7, 8 and correspond to supply control valves that supply the hydrogen gas within the multistage accumulator 2 into the filling nozzles 26A, 26B by opening these valves.

The cooler 29 is a cooling device for cooling the hydrogen gas flowing in the gas supply pipelines 7, 8. The cooler 29 cools the hydrogen gas in the middle position of the gas supply pipelines 7, 8 for suppressing a temperature rise of the hydrogen gas to be filled into the filled tanks 53, 54. The cooler 29 includes the heat exchangers 29A, 29B that are arranged in the middle part of the gas supply pipelines 7, 8 to be positioned between the flow rate adjusting valves 27A, 27B and the cutoff valves 28A, 28B, and a chiller unit (not shown) that is connected via coolant pipelines to the heat exchangers 29A, 29B and is provided with a drive mechanism of a compressor, a pump and the like.

The coolant pipelines cause a coolant (for example, liquid containing ethylene glycol and the like) to circulate between the chiller unit and the heat exchangers 29A, 29B. The chiller unit circulates the coolant via the coolant pipelines between the heat exchangers 29A, 29B. As a result, the heat exchangers 29A, 29B of the cooler 29 exchange heat between the hydrogen gas flowing in the gas supply pipelines 7, 8 and the coolant to cool down a temperature of the hydrogen gas to be supplied toward the filling hoses 25A, 25B to a specified temperature (for example, $-33 \sim -40°$ C.).

Coriolis flowmeters 30A, 30B are arranged in the dispenser housing 6 to be positioned in the middle of the gas supply pipelines 7, 8. The flowmeters 30A, 30B respectively measure a mass flow quantity of the measured fluid circulating in the gas supply pipelines 7, 8. The flowmeters 30A, 30B respectively measure a flow rate (mass flow rate) of the hydrogen gas flowing in the gas supply pipelines 7, 8 between the primary pressure sensors 31A, 31B and the flow rate adjusting valves 27A, 27B, for example, and outputs signals (flow rate pulses) in accordance with the measurement result to the integrated control panel 9. The integrated control panel 9 calculates a filling quantity of the hydrogen gas into the filled tanks 53, 54 mounted on the vehicles 51, 52 and displays a delivery quantity (corresponding to a feed quantity) of hydrogen gas fuel on the display part 37 or the like. As a result, the display content is informed to customers and the like, for example.

The primary pressure sensors 31A, 31B are respectively arranged in the gas supply pipelines 7, 8 to be positioned closer to the upstream side than the flowmeters 30A, 30B and the flow rate adjusting valves 27A, 27B. The primary pressure sensors 31A, 31B respectively detect a pressure of hydrogen gas to be supplied into the gas supply pipelines 7, 8 from the multistage accumulator 2. The primary pressure sensors 31A, 31B are connected to the integrated control panel 9. The primary pressure sensors 31A, 31B respectively detect a pressure in the gas supply pipelines 7, 8 on the multistage accumulator 2-side and outputs detection signals in accordance with the measured pressures to the integrated control panel 9.

The secondary pressure sensors 32A, 32B are respectively arranged in the gas supply pipelines 7, 8 to be positioned closer to the downstream side (that is, closer to the filling nozzles 26A, 26B) than the cutoff valves 28A, 28B. The secondary pressure sensors 32A, 32B respectively detect a pressure of the hydrogen gas to be supplied from the multistage accumulator 2, more specifically detect a pressure in the filled tanks 53, 54 mounted on the vehicles 51, 52, or detect a pressure in the pipeline middle substantially equivalent to the pressure in the filled tanks 53, 54. The secondary pressure sensors 32A, 32B are also connected to the integrated control panel 9. The secondary pressure sensors 32A, 32B respectively detect a pressure in the gas supply pipelines 7, 8 in the vicinity to the filling nozzles 26A, 26B (that is, a pressure in the filled tanks 53, 54) and outputs detection signals in accordance with the measured pressures to the integrated control panel 9.

The temperature sensors 33A, 33B are respectively arranged in the middle of the gas supply pipelines 7, 8 to be positioned closer to the filling nozzles 26A, 26B than the secondary pressure sensors 32A, 32B. The temperature sensors 33A, 33B respectively detect a temperature of the hydrogen gas flowing in the gas supply pipelines 7, 8. The temperature sensors 33A, 33B are also connected to the integrated control panel 9. The temperature sensors 33A, 33B respectively detect a temperature of the hydrogen gas in the gas supply pipelines 7, 8 and outputs detection signals in accordance with the measured temperatures to the integrated control panel 9. It should be noted that the arrangement relation between the temperature sensors 33A, 33B and the secondary pressure sensors 32A, 32B is not limited to the arrangement as shown in FIG. 2 but may be the arrangement in reverse to each other.

The outside air temperature sensor 36 is disposed in the dispenser housing 6 to detect an ambient temperature of the dispenser housing 6. The outside air temperature sensor 36 is also connected to the integrated control panel 9. The outside air temperature sensor 36 detects a surrounding temperature as an environment temperature and outputs detection signals in accordance with the measured temperatures to the integrated control panel 9. The detection value (outside air temperature) of the outside air temperature sensor 36 is used for setting a pressure rise rate (reference pressure rise rate: APRR.A, APRR.B), a target completion pressure (Pe) and the like at the time of supplying the hydrogen gas into the filled tanks 53, 54 mounted on the vehicles 51, 52.

The illustration is omitted, but a filling start switch and a filling stop switch as an operation part of the dispenser unit 5 (more specifically, a filling start switch and a filling stop switch for A-system and a filling start switch and a filling stop switch for B-system) are arranged on the front side of the dispenser housing 6. The filling start switch and the filling stop switch are switches manually operable by a worker in the fuel supply station (hydrogen station), for example. The filling start switch is operated at the time of starting the filling of the hydrogen gas. The filling stop switch is operated at the time of stopping the filling of the hydrogen gas in the middle of filling the hydrogen gas. The filling start switch and the filling stop switch respectively output signals in accordance with operating conditions to the integrated control panel 9. As a result, the integrated control panel 9 opens or closes the cutoff valves 28A, 28B in response to the signals. In addition, an outside equipment device of POS or the like (not shown) and the integrated control panel 9 are connected, and a filling quantity of the hydrogen gas to be filled into the filled tanks 53, 54 is set by a preset switch disposed in the outside equipment device.

For example, depressurization pipelines 38A, 38B for depressurizing a gas pressure from the filling hoses 25A, 25B are arranged to be branched closer to the downstream side than the cutoff valves 28A, 28B in the gas supply pipelines 7, 8. The depressurization valves 34A, 34B as an electromagnetic or a pneumatic operational valve device are arranged in the middle of the depressurization pipelines 38A, 38B. The depressurization valves 34A, 34B are controlled to open based upon signals from the integrated control panel 9 when the filling work of the hydrogen gas using the filling hoses 25A, 25B (filling nozzles 26A, 26B) is completed and the cutoff valves 28A, 28B are closed.

In a case of removing (the connection couplers of) the filling nozzles 26A, 26B from the filling ports 53A, 54A of the filled tanks 53, 54, it is necessary to reduce the pressure in the filling hoses 25A, 25B respectively to an atmospheric pressure level. Therefore, at the completion time of the gas filling work, a tip end side of each of the depressurization pipelines 38A, 38B is opened to the atmosphere by temporarily opening the depressurization valves 34A, 34B. Thereby, the hydrogen gas on the filling hoses 25A, 25B-sides is released to an exterior to reduce the pressure in the filling hoses 25A, 25B respectively to the atmospheric pressure level. As a result, the filling nozzles 26A, 26B can be removed from the filling ports 53A, 54A of the filled tanks 53, 54.

As shown in FIG. 1, the display part 37 is disposed on the front surface side of the dispenser housing 6. The display part 37 is disposed in a height position where a worker executing the filling work of the hydrogen gas can easily visualize it and executes information display necessary for the filling work of the hydrogen gas. The display part 37 is configured of a crystal monitor, a crystal touch panel and the like, for example. The display part 37 displays the filling condition (hydrogen gas supply quantity, error occurrence and the like) of the hydrogen gas into the filled tanks 53, 54 mounted on the vehicles 51, 52, for example, by control signals from the integrated control panel 9 when the integrated control panel 9 is executing the filling control compliant with a filling protocol. In a case where the display part 37 is formed with a crystal touch panel, the filling start switch, the filling stop switch and the preset switch as the operation parts may be configured by the display part 37.

The nozzle retainers 35A, 35B are arranged on the side surface sides of the dispenser housing 6, for example. The first filling nozzle 26A is removably retained in the first nozzle retainer 35A. The second filling nozzle 26B is removably retained in the second nozzle retainer 35B. The filling nozzles 26A, 26B are retained in the nozzle retainers 35A, 35B at the non-filling time of the hydrogen gas (that is, a waiting time of the filling work). At the time of filling the hydrogen gas, the filling nozzles 26A, 26B are removed from the nozzle retainers 35A, 35B by the worker of the filling work. The nozzle retainers 35A, 35B correspond to nozzle accommodation parts configured to accommodate the filling nozzles 26A, 26B on the side surface sides of the dispenser housing 6.

The vehicles 51, 52 each that are driven to travel using the hydrogen gas as fuel are configured by a four-wheel automobile (passenger car) as shown in FIG. 2, for example. The vehicles 51, 52 respectively are provided with a drive device (not shown) including a fuel battery and an electric motor, for example, the filled tanks 53, 54 as shown by a dotted line in FIG. 2, and the like. The filled tanks 53, 54 each are configured as a container having a pressure resisting structure for filling the hydrogen gas and are mounted on the rear part sides of the vehicles 51, 52, for example. It should be noted that the filled tanks 53, 54 are configured to be mounted, not limited on the rear part sides of the vehicles 51, 52, but may be configured to be mounted on the front part sides or on the central part sides thereof.

The filled tanks 53, 54 are provided with the filling ports 53A, 54A (receptacles) on which the connection couplers of the filling nozzles 26A, 26B are removably attached. The filling of the hydrogen gas is executed into the filled tanks 53, 54 mounted on the vehicles 51, 52 in a state where the filling nozzles 26A, 26B are air-tightly connected to the filling ports 53A, 54A. At this time, the filling nozzles 26A, 26B are locked by the locking mechanisms in such a way as to not inadvertently disengage from the filling ports 53A, 54A. The dispenser unit 5 fills the cooled hydrogen gas into the filled tanks 53, 54 mounted on the vehicles 51, 52 by utilizing a pressure difference. It should be noted that the filling ports 53A, 54A are provided therein with check valves that allow the circulation of the hydrogen gas into the filled tanks 53, 54 mounted the vehicles 51, 52 from the filling nozzles 26A, 26B and block the circulation of the hydrogen gas from the filled tanks 53, 54 into the filling nozzles 26A, 26B.

The integrated control panel 9 is configured of a control device (controller or control unit) that controls the compressor 4, the openable/closable valves 13, 14, 15, 16, 17, 18, 19, 20, 21, 23, 24, the flow rate adjusting valves 27A, 27B, the cutoff valves 28A, 28B, the depressurization valves 34A, 34B, and the like. The integrated control panel 9 executes control of the compressor 4, the openable/closable valves 13, 14, 15, 16, 17, 18, 19, 20, 21, 23, 24, the flow rate adjusting valves 27A, 27B, and the cutoff valves 28A, 28B to control the fuel supply into the filled tanks 53, 54 as a filling target. Particularly, the integrated control panel 9 is configured as a filling control device that controls the supply of the hydrogen gas into the filled tanks 53, 54 mounted on the vehicles 51, 52 by controlling opening/closing of the openable/closable valves 16, 17, 18, 19, 20, 21, the flow rate adjusting valves 27A, 27B, and the cutoff valves 28A, 28B.

The integrated control panel 9 includes a microcomputer provided with a CPU, a memory and the like, for example. An input side of the integrated control panel 9 is connected to the flowmeters 30A, 30B, the primary pressure sensors 31A, 31B, the secondary pressure sensors 32A, 32B, the temperature sensors 33A, 33B, the outside air temperature sensor 36, the filling start switch, the filling stop switch, and the like. On the other hand, an output side of the integrated control panel 9 is connected to the compressor 4, the openable/closable valves 13, 14, 15, 16, 17, 18, 19, 20, 21, 23, 24, the flow rate adjusting valves 27A, 27B, the cutoff valves 28A, 28B, depressurization valves 34A, 34B, the display part 37, and the like. It should be noted that, not limited to the integrated control panel 9, the flow meter 30A and the like may be connected to the filling control unit disposed in the dispenser housing, for example.

When the filling start switch is operated in a state where "the filling nozzle 26A" and/or "the filling nozzle 26B" is connected to "the filled tank 53 mounted on the vehicle 51" and/or "the filled tank 54 mounted on the vehicle 52", the integrated control panel 9 outputs a valve opening signal to "any one of the openable/closable valves 16, 18, 20 and the flow rate adjusting valve 27A and the cutoff valve 28A" and/or "any one of the openable/closable valves 17, 19, 21 and the flow rate adjusting valve 27B and the cutoff valve 28B" to open valves that should be opened. As a result, the gas filling work for supplying the hydrogen gas in the multistage accumulator 2 into the filled tank 53 and/or the filled tank 54 is started.

In addition, the integrated control panel 9 monitors, for example, the measurement result of the flowmeters 30A, 30B, the primary pressure sensors 31A, 31B, the secondary pressure sensors 32A, 32B and the temperature sensors 33A, 33B, while adjusting "the opening/closing of the openable/closable valves 16, 17, 18, 19, 20, 21" and "the opening of the flow rate adjusting valves 27A, 27B" in a predetermined control system (for example, a constant-pressure rise control system or constant flow rate control system). That is, the integrated control panel 9 controls the openable/closable valves 16, 17, 18, 19, 20, 21 and the opening of the flow rate adjusting valves 27A, 27B so that a pressure rise rate (rising pressure rate) obtained from pressure values detected by the secondary pressure sensors 32A, 32B at the filling time of the hydrogen gas corresponds to a predetermined pressure rise rate, for example.

As a result, the integrated control panel 9 can control a pressure and a flow rate of hydrogen gas to be supplied into the filled tanks 53, 54 mounted on the vehicles 51, 52 from the multistage accumulator 2 to be in an appropriate state. At this time, the integrated control panel 9 integrates flow rate pulses from the flowmeters 30A, 30B to calculate a filling quantity (mass) of fuel and closes a valve in the middle of opening when the pressure value of the hydrogen gas detected by the secondary pressure sensors 32A, 32B has reached a target completion pressure (Pe), thus stopping the filling of the fuel.

In addition, in a case where the filling stop switch is operated during the filling of the hydrogen gas, even when the filling quantity or the pressure value of the hydrogen gas has not reached the target value yet, the valve in the middle of opening is closed in response to a signal from the integrated control panel 9 for forcibly stopping the filling operation. Thereafter, the integrated control panel 9 opens the depressurization valves 34A, 34B to release the hydrogen gas downstream of the cutoff valves 28A, 28B into the depressurization pipelines 38A, 38B and closes the depressurization valves 34A, 34B after reducing the pressure in the filling nozzles 26A, 26B.

The memory in the integrated control panel 9 is configured of a non-volatile memory, a RAM, a ROM and the like, for example. A processing program for executing the processing flow as shown in FIG. 3 to FIG. 7 to be described later, for example, that is, the program for filling control processing is stored in the memory in the integrated control panel 9. In addition, a filling control map of a lookup table to be used for determining a reference pressure rise rate (APRR.A, APRR.B) and a target completion pressure (Pe), and the like are stored in the memory.

The filling control map is set according to the filling pressure classification (for example, 70 MPa class, 35 MPa class or the like), a supply fuel temperature classification (for example, −40° C., −20° C. or the like) and the capacity classification of the filled tanks 53, 54, and the reference pressure rise rate, the target completion pressure and the like are set in accordance with the detection value (outside air temperature) of the outside air temperature sensor 36 and the initial pressure of the filled tanks 53, 54. Accordingly, the reference pressure rise rate, the target completion pressure and the like can be obtained, based upon the outside air temperature (environmental temperature) detected by the outside air temperature sensor 36 and the initial pressure of the filled tanks 53, 54, by referring to the filling control map corresponding thereto.

In this way, the hydrogen fuel supply system 3 is provided with the gas filling device 1. The gas filling device 1 is provided with the first gas supply pipeline 7 (and the first filling hose 25A) as the first gas supply path, the second gas supply pipeline 8 (and the second filling hose 25B) as the second gas supply path, and the integrated control panel 9 as the control device. The first gas supply pipeline 7 supplies the hydrogen gas into the first filled tank 53 mounted on the first vehicle 51 from the multistage accumulator 2. The second gas supply pipeline 8 supplies the hydrogen gas into the second filled tank 54 mounted on the second vehicle 52 different from the first vehicle 51 from the multistage accumulator 2. The multistage accumulator 2 accumulates the hydrogen gas as the fuel gas therein.

The multistage accumulator 2 is configured of the plurality of accumulators 2A, 2B, 2C, and is connected to both of the first gas supply pipeline 7 and the second gas supply pipeline 8. That is, the multistage accumulator 2 is an accumulator in common with the first gas supply pipeline 7 and the second gas supply pipeline 8. The integrated control panel 9 controls the pressure rise rate of hydrogen gas to be supplied through the first gas supply pipeline 7 into the first filled tank 53. In addition, the integrated control panel 9 controls the pressure rise rate of hydrogen gas to be supplied through the second gas supply pipeline 8 into the second filled tank 54. In this case, the integrated control panel 9 can control the pressure rise rate by adjusting the opening of the flow rate adjusting valves 27A, 27B respectively, for example.

Incidentally, in the plurality of dispensers commonly using the plurality of accumulators, at the time of simultaneously executing the filling into a plurality of tanks by supply of hydrogen gas (hydrogen fuel) from the same accumulator, there are some cases where pressures (filling pressures) of the respective tanks differ. In this case, there occurs a tendency that the hydrogen gas is supplied into the tank on the lower pressure side only, generating a possibility that the flow rate of the hydrogen gas into the tank on the higher pressure side is equal to or less than a threshold value (flow rate lower limit) for stopping the filling. As a result, the filling into the tank on the higher pressure side ends before reaching the target completion pressure (for example, pressure in the tank at the maximum filling). This phenomenon occurs at the filling time when a difference in pressure between an accumulator and a tank mounted on a vehicle becomes small, more specifically at the time of executing the filling by the high pressure bank (high pressure accumulator) or at the time of executing the filling through the direct filling path.

Here, for example, it is considered that there is provided a preliminary accumulator to be used at the high-pressure filling for being capable of continuing to execute the filling of the tank on the higher pressure side. In this case, however, there is a possibility that the cost increases according to the preliminary accumulator being necessary as compared to the configuration without the preliminary accumulator. In addition, for example, at the time of starting the filling of a second vehicle (vehicle on the lower pressure side) in the middle of the filling of a first vehicle (vehicle on the higher pressure side), it is considered to delay the timing of this start. However, in this case, when the operation of the filling start of the second vehicle is made, the filling is not started regardless of this operation being made. As a result, there is a possibility of giving a feeling of strangeness and a feeling of discomfort (a feeling of irritation) to a worker who executes the filling work of the hydrogen gas.

Therefore, according to the embodiment when the hydrogen gas is filled (supplied) into both of the first filled tank 53 (first vehicle 51) and the second filled tank 54 (second vehicle 52) from the multistage accumulator 2, the integrated control panel 9 sets the pressure rise rate of the first filled tank 53 or the pressure rise rate of the second filled tank 54 to be lower than the reference pressure rise rate (APRR.A or APRR.B) according to a pressure difference between the first filled tank 53 and the second filled tank 54. In this case, the reference pressure rise rate (APRR.A or APRR.B) corresponds to the pressure rise rate of one of the first filled tank 53 and the second filled tank 54 at the time of filling the hydrogen gas into the one only from the multistage accumulator 2, for example.

FIG. 8 shows an example of a time change in pressure of the first filled tank 53 and an example of a time change in pressure of the second filled tank 54 according to a first embodiment. In FIG. 8, a solid characteristic line 61 indicates a time change in pressure of the first filled tank 53 mounted on the first vehicle 51 (FCV1), and a dashed characteristic line 62 indicates a time change in pressure of the second filled tank 54 mounted on the second vehicle 52 (FCV2). In the embodiment, a preceding vehicle into which hydrogen gas is in advance filled is defined as the first vehicle 51, and a subsequent vehicle into which hydrogen gas is filled behind the first vehicle 51 is defined as the second vehicle 52. In a case where a pressure in the first filled tank 53 is indicated by PA0 and a pressure in the second filled tank 54 is indicated by PB0 when the filling into the second vehicle 52 as the subsequent vehicle is started, a relation of PA0>PB0 is set.

That is, when the filling of the hydrogen gas into both of the first filled tank 53 and the second filled tank 54 is started, the filled tank on the higher pressure side (that is, the higher pressure-side filled tank) is defined as the first filled tank 53. In addition, when the filling of the hydrogen gas into both of the first filled tank 53 and the second filled tank 54 is started, the filled tank on the lower pressure side (that is, the lower pressure-side filled tank) is defined as the second filled tank 54. The pressure for stopping the filling of the hydrogen gas into the filled tanks 53, 54 mounted on the vehicles 51, 52 is defined as the target completion pressure Pe. It should be noted that the preceding vehicle may be defined as the second vehicle, and the subsequent vehicle may be defined as the first vehicle. The higher pressure-side filled tank may be defined as the second filled tank, and the lower pressure-side filled tank may be defined as the first filled tank. The target completion pressure Pe in the first filled tank 53 may be different from the target completion pressure Pe in the second filled tank 54. "A" in FIG. 8 corresponds to points for the switching of the accumulators 2A, 2B, 2C to be connected to the filled tank 53. The same thing can be said about "A" in FIG. 9 to be described later. In addition, the same thing can be said about the filled tank 54 as well.

In the first embodiment, the integrated control panel 9 sets the pressure rise rate APRR2.B of the lower pressure-side filled tank (second filled tank 54) to be lower than the reference pressure rise rate APRR.B so that the lower pressure-side filled tank (second filled tank 54) reaches the target completion pressure Pe later by a predetermined time TL than a time when the higher pressure-side filled tank (first filled tank 53) reaches the target completion pressure Pe. That is, the integrated control panel 9 sets the pressure rise rate (change rate) of the lower pressure-side filled tank (second filled tank 54) to be the pressure rise rate APRR2.B (<APRR.B) lower than the reference pressure rise rate APRR.B by adjusting the opening of the flow rate adjusting valve 27B.

The predetermined time TL (delay time TL) can be set as a time (for example, 60 sec) that enables the pressure rise rate of the higher pressure-side filled tank (first filled tank 53) to be maintained in the reference pressure rise rate APRR.A even when the filling of the hydrogen gas is executed into both of the filled tanks 53, 54, for example. More specifically, the predetermined time TL can be set, when the hydrogen gas is supplied into both of the first filled tank 53 and the second filled tank 54 from the multistage accumulator 2, as a time that makes it possible to obtain the pressure rise rate to the extent that the hydrogen gas is not supplied into both of the first filled tank 53 and the second filled tank 54 from the third accumulator 2C as a high pressure accumulator of the multistage accumulator 2. This predetermined time TL is in advance found by experiments, calculations, simulations and the like.

In addition, in the embodiment the integrated control panel 9 determines presence/absence of a change in pressure rise rate in accordance with a pressure PA0 in the first filled tank 53 and a pressure PB0 in the second filled tank 54 when the filling of the hydrogen gas is started into both of the first filled tank 53 and the second filled tank 54. That is, in a case where a difference between the pressure in the first filled tank 53 and the pressure in the second filled tank 54 (|PA−PB|) is larger than a predetermined value Pt, the integrated control panel 9 sets the pressure rise rate of the lower pressure-side filled tank (second filled tank 54) to be lower than the reference pressure rise rate APRR.B. On the other hand, in a case where the difference between the pressure in the first filled tank 53 and the pressure in the second filled tank 54 (|PA−PB|) is equal to or less than the predetermined value Pt, the integrated control panel 9 keeps the pressure rise rate of the first filled tank 53 to be the reference pressure rise rate APRR.A and sets the pressure rise rate of the second filled tank 54 to be the reference pressure rise rate APRR.B.

The predetermined value Pt can be set as a determination value as to whether to be capable of continuing the filling of the hydrogen gas into both of the filled tanks 53, 54 respectively in the reference pressure rise rates APRR.A and APRR.B. That is, the predetermined value Pt can be set as a threshold value (boundary value) as to whether a time until completion of the supply (filling) of the hydrogen gas into the higher pressure-side filled tank gets longer or as a threshold value (boundary value) as to whether the supply (filling) of the hydrogen gas ends in the middle when the filling of the hydrogen gas into both of the filled tanks 53, 54 respectively is executed in the reference pressure rise rates APRR.A and APRR.B. Specifically, the predetermined value Pt can be set as a threshold value (boundary value) as to whether there occurs a state where the hydrogen gas is supplied into both of the first filled tank 53 and the second filled tank 54 from the third accumulator 2C as the high pressure accumulator of the multistage accumulator 2 when the filling of the hydrogen gas is executed into both of the filled tanks 53, 54 respectively in the reference pressure rise rates APRR.A and APRR.B. This predetermined value is in advance found by experiments, calculations, simulations or the like.

Further, in the embodiment, in a case where the pressure rise rate of the lower pressure-side filled tank (second filled tank 54) as one of the first filled tank 53 and the second filled tank 54 is lowered from the reference pressure rise rate APRR.B, when the filling of the hydrogen gas into the higher pressure-side filled tank (first filled tank 53) as the other filled tank is completed, the integrated control panel 9 sets the pressure rise rate of the lower pressure-side filled tank (second filled tank 54) to be the reference pressure rise rate APRR.B. That is, as shown in FIG. 8, the pressure rise rate of the lower pressure-side filled tank (second filled tank 54) changes in a point of pressure PBc. In this case, the hydrogen gas is filled into the lower pressure-side filled tank (second filled tank 54) in the pressure rise rate APRR2.B having an inclination smaller than that of the reference pressure rise rate APRR.B until the filling of the higher pressure-side filled tank (first filled tank 53) is completed. When the filling of the higher pressure-side filled tank (first filled tank 53) is completed, the hydrogen gas is filled into the lower pressure-side filled tank (second filled tank 54) in the reference pressure rise rate APRR.B having an inclination larger than that of the pressure rise rate APRR2.B until this point.

In this way, the hydrogen fuel supply system 3 according to the embodiment is a facility that is provided with the multistage accumulator 2 including the plurality of (for example, three) accumulators 2A, 2B, 2C in which the hydrogen gas is accumulated, and the dispenser unit 5 configured to fill the hydrogen gas into the fuel cell vehicle (FCV) by receiving the supply of the hydrogen gas from the multistage accumulator 2. The dispenser unit 5 is configured so that the plurality of (for example, two) gas supply pipelines 7, 8 commonly using the multistage accumulator 2 are provided and the hydrogen gas can be filled through the plurality of gas supply pipelines 7, 8 into the plurality of (for example, two) fuel cell vehicles (the first vehicle 51 and second vehicle 52). That is, the dispenser unit 5 is configured to be capable to start the filling of the hydrogen gas to the second vehicle 52 through the second gas supply pipeline 8 in the middle of filling the hydrogen gas to the first vehicle 51 through the first gas supply pipeline 7 (simultaneously filling a plurality of vehicles).

As shown in FIG. 8, firstly the filling into the first filled tank 53 mounted on the first vehicle 51 is started. At this time, a pressure rise rate to be determined according to a filling protocol as a preliminarily defined standard is defined as a reference pressure rise rate APRR.A. That is, the integrated control panel 9 determines the reference pressure rise rate APRR.A following the start of the filling. In addition, the integrated control panel 9 determines a target completion pressure Pe as well along with it. The reference pressure rise rate APRR.A and the target completion pressure Pe are determined from an initial pressure in the first filled tank 53 and an outside air temperature (environmental temperature) at the time of starting the filling.

Therefore, the filling control map, that is, the corresponding relation between initial pressures, outside air temperatures, pressure rise rates and completion pressures is in advance stored in the integrated control panel 9. The integrated control panel 9 uses the filling control map to find a pressure rise rate and a completion pressure corresponding to the initial pressure and the outside air temperature (environmental temperature) at the filling start, and the found pressure rise rate and completion pressure are defined as the reference pressure rise rate APRR.A and the target completion pressure Pe. The reference pressure rise rate APRR.A corresponds to a pressure rise rate to be set at the time of filling the hydrogen gas into the first filled tank 53 only from the multistage accumulator 2. The integrated control panel 9 adjusts the opening of the flow rate adjusting valve 27A so that the pressure in the first filled tank 53 rises in the pressure rise rate APRR.A.

Next, the filling into the second filled tank 54 mounted on the second vehicle 52 is started. Thereby, the simultaneous filling to the two vehicles is started. At this time, the integrated control panel 9 uses the filling control map to calculate a reference pressure rise rate APRR.B and a target completion pressure Pe from the initial pressure PB0 in the second filled tank 54 and the outside air temperature (environmental temperature). Together with this, the integrated control panel 9 compares the pressures in the filled tanks 53, 54 respectively. As to the pressures at this time, that is, the pressure in the first filled tank 53 at the simultaneous filling start is defined as PA0, and the pressure in the second filled tank 54 at the simultaneous filling start (=an initial pressure in the second filled tank 54) is defined as PB0. In the embodiment, the pressure PA0 in the first filled tank 53 and the pressure PB0 in the second filled tank 54 are found by using detection values of the secondary pressure sensors 32A, 32B as pressure sensors at the discharge side of the dispenser unit 5 (or estimation values calculated from the detection values). However, not limited thereto, for example, a pressure sensor on the vehicle side or for example, a detection value of a pressure sensor disposed in a filled tank (or an estimation value calculated from this detection value) may be used.

The integrated control panel 9 determines presence/absence of a change in pressure rise rate in accordance with a pressure PA0 in the first filled tank 53 and a pressure PB0 in the second filled tank 54. That is, the integrated control panel 9 determines whether the pressure difference (|PA0–PB0|) is larger than a predetermined value Pt or not. In a case where the integrated control panel 9 determines that the pressure difference (|PA0–PB0|) is larger than the predetermined value Pt, the integrated control panel 9 changes the pressure rise rate of the second filled tank 54 on the lower pressure side at the simultaneous filling start. In this case, assuming that the filling is executed into the second filled tank 54 in the reference pressure rise rate APRR.B, a pressure PBc for becoming the filling completion pressure Pe in the predetermined time TL is found by the integrated control panel 9. That is, the pressure PBc is calculated according to the following Formula 1. It should be noted that since the reference pressure rise rate APRR is determined based on the environmental temperature, APRR.A≅APRR.B.

$$PBc=Pe-(APRR.B \cdot TL) \qquad \text{[Formula 1]}$$

The integrated control panel 9 finds a time TA until the filling into the first filled tank 53 on the higher pressure side is completed, that is, in a case of assuming that the filling is executed into the first filled tank 53 in the reference pressure rise rate APRR.A, finds the time TA until the pressure in the first filled tank 53 reaches a filling completion pressure Pe. That is, the time TA is calculated according to the following Formula 2.

$$TA = \frac{Pe - PA0}{APRR.A} \qquad \text{[Formula 2]}$$

The integrated control panel 9 calculates the pressure rise rate APRR2.B of the second filled tank 54 from the time TA in the Formula 2 and the pressure PBc in the Formula 1. Specifically the integrated control panel 9 finds a pressure rise rate APRR2.B so that the pressure in the second filled tank 54 rises from the pressure PB0 at the simultaneous filling start to the pressure PBc in the Formula 1 for the time TA until the filling into the first filled tank 53 is completed. That is, the pressure rise rate APRR2.B is calculated according to the following Formula 3.

$$APRR2.B = \frac{PBc - PA0}{TA} \qquad \text{[Formula 3]}$$

The integrated control panel 9 executes the filling into the second filled tank 54 in the pressure rise rate APRR2.B. That is, the integrated control panel 9 adjusts an opening of the flow rate adjusting valve 27B so that the pressure in the second filled tank 54 rises in the pressure rise rate APRR2.B. The integrated control panel 9 executes the filling into the second filled tank 54 in the reference pressure rise rate APRR.B when the filling into the first filled tank 53 is completed. That is, when the filling into the first filled tank 53 is completed, the integrated control panel 9 adjusts the opening of the flow rate adjusting valve 27B so that the pressure in the second filled tank 54 rises in the pressure rise rate APRR2.B. As a result, the filling into the second filled tank 54 can be delayed by a predetermined time TL.

The predetermined time TL is set so that the hydrogen gas is not supplied into both of the first filled tank 53 and the second filled tank 54 from the third accumulator 2C as the high pressure accumulator of the multistage accumulator 2. In addition, for example, in a case where the direct filling is executed through the direct filling pipeline 22 at the final filling, the predetermined time TL is set so that the hydrogen gas is not supplied into both of the first filled tank 53 and second filled tank 54 from the direct filling pipeline 22.

When the integrated control panel 9 simultaneously executes the filling into a plurality of vehicles in this way, the integrated control panel 9 delays a filling completion time of the second vehicle 52 as a vehicle on a side where the filling pressure is low by a predetermined time TL from the filling completion time of the first vehicle 51 as a vehicle on a side where the filling pressure is high. At this time, the integrated control panel 9 calculates a delay filling speed (delay pressure rise rate APRR2.B) for being capable of delaying the filling completion by the preset time TL, as the filling speed (pressure rise rate) of the second vehicle 52. The integrated control panel 9 executes the filling into the second vehicle 52 in the delay filling speed (delay pressure rise rate APRR2.B) during the simultaneous filling. The integrated control panel 9 executes, when the simultaneous filling is completed, that is, when the filling into the first vehicle 51 is completed, the filling into the second vehicle 52 in the reference filling speed (reference pressure rise rate APRR.B).

Next, an explanation will be made of the control processing (filling control processing of hydrogen gas) to be executed in the integrated control panel 9 by referring to FIG. 3 to FIG. 7. It should be noted that the control processing in FIG. 3 to FIG. 7 is repeatedly executed in a predetermined control cycle (for example, 10 ms) while supplying power to the integrated control panel 9, for example. In addition, in FIG. 3 to FIG. 5 the processing in regard to A-system (first gas supply pipeline 7) is indicated in "DSP-A" and "(A)" is attached as an index of the step number and the processing in regard to B-system (second gas supply pipeline 8) is indicated in "DSP-B" and "(B)" is attached as an index of the step number, For example, when a vehicle (first vehicle 51) to be filled from now on arrives at a stop position of A-system (first gas supply pipeline 7-side), the processing in regard to "DSP-A" in FIG. 3 to FIG. 5, that is, the processing in which the index (A) is attached to the step number is started. In addition, for example, when a vehicle (second vehicle 52) to be filled from now on arrives at a stop position of B-system (second gas supply pipeline 8-side), the processing in regard to "DSP-B" in FIG. 3 to FIG. 5, that is, the processing in which the index (B) is attached to the step number is started. Hereinafter, an explanation will be made primarily of the processing in regard to "DSP-A" as the processing of A-system (first gas supply pipeline 7-side). The processing in regard to "DSP-B" is similar to the processing in regard to "DSP-A" except for being different in a point of the processing in regard to B-system (second gas supply pipeline 8-side), and therefore, the overlapping explanation is omitted.

In S1 (A), it is determined whether or not the filling nozzle 26A is removed from the nozzle retainer 35A and the filling nozzle 26A is connected to the filling port 53A of the filled tank 53 mounted on the vehicle 51. In a case where in S1 (A) it is determined that the filling nozzle 26A is connected to the filling port 53A, the process goes to S2 (A). In S2 (A), information of the vehicle 51 is received. That is, the integrated control panel 9 makes radio communication with the vehicle 51 and the like to obtain the information of the vehicle 51, for example, the information on the capacity and the like of the filled tank 53. In subsequent S3 (A), it is determined whether or not an operation of the filling start is made. That is, in S3 (A), it is determined whether or not the filling start switch for A-system is operated. In a case where in S3 (A), it is determined that the filling start switch for A-system is operated, the process goes to S4 (A).

In S4 (A), DSP information is measured. That is, in S4 (A), a necessary state quantity for finding the reference pressure rise rate, the target completion pressure and the like by using the filling control map, specifically the environmental temperature (outside air temperature) and the pressure (initial pressure) in the filled tank 53 are measured. The environmental temperature (outside air temperature) is measured (detected) by the outside air temperature sensor 36, and the pressure (initial pressure) in the filled tank 53 is measured (detected) by the secondary pressure sensors 32A, 32B. In this case, the pressure (initial pressure) in the filled tank 53 is measured at the time of executing initial pressure measurement filling processing of S5 (A) subsequent to S4 (A). That is, in S5 (A), a small quantity of gas supply is carried out into the filled tank 53 for measuring the pressure (initial pressure) in the filled tank 53. The integrated control panel 9 measures (calculates) the pressure (initial pressure) in the filled tank 53 based upon the gas flow rate, the pressures of the secondary pressure sensors 32A, 32B, and the like at this time In S6 (A) subsequent to S5 (A), the reference pressure rise rate APRR.A and the target completion pressure Pe corresponding to the reference filling speed are calculated based upon the environmental temperature and the initial pressure measured in the processing in S4 (A) and S5 (A). In this case, the reference pressure rise rate APRR.A and the target completion pressure Pe are calculated by using the filling control map (the corresponding relationship between the initial pressure, the outside air temperature, the pressure rise rate, and the completion pressure. When in S6 (A) the reference pressure rise rate APRR.A and the target completion pressure Pe are calculated, the process goes via "A" in FIG. 3 and "A" in FIG. 4 to S7 (A) in FIG. 4. In S7 (A) in FIG. 4 subsequent to S6 (A) in FIG. 3, it is determined whether or not the filling of DSP-B (B-system) is started. In a case where in S7 (A), "NO" determination is made, that is, it is determined that the filling of DSP-B (B-system) is not started, the process goes to S8 (A). In a case where in S7 (A), "YES" determination is made, that is, it is determined that the filling of DSP-B (B-system) is started, the process goes to the process of the coordinate control in S21.

In S8 (A), the main filling control by DSP-A (A-system) is executed. That is, in S8 (A), the filling of the hydrogen gas into the filled tank 53 is executed "in the reference pressure rise rate APRR.A calculated in S6 (A)" or "in the pressure rise rate APRR2.A calculated in the coordinate control process in S21 (more specifically in S32 in FIG. 6)". At this time, the integrated control panel 9 controls the opening/closing of the openable/closable valves 16, 18, 20, the opening/closing of the cutoff valve 28A and the opening of the flow rate adjusting valve 27A so that the filling of the hydrogen gas into the filled tank 53 can be executed in the reference pressure rise rate APRR.A or in the pressure rise rate APRR2.A.

In S9 (A) subsequent to S8 (A), it is determined whether or not the filling by the DSP-A (A-system) is completed. That is, in S9 (A) the integrated control panel 9 determines whether or not the pressure in the filled tank 53 has reached the target completion pressure Pe. Here, for example, in a case where the target completion pressure Pe is the maximum filling pressure (pressure corresponding to the fully filled tank), when the pressure in the filled tank 53 has reached the target completion pressure Pe, the pressure in the filled tank 53 and the pressure of the third accumulator 2C as the high pressure accumulator of the multistage accumulator 2 become substantially the same (target completion pressure Pe). Therefore, for example, in a case where the filling speed of the hydrogen gas into the filled tank 53 becomes zero or in a case where a state where the filling speed is zero lasts for a predetermined time, the integrated control panel 9 determines that the pressure in the filled tank 53 has reached the target completion pressure Pe, thus making it possible to complete the filling. It should be noted that here, the filling completion is determined based upon whether or not the pressure in the filled tank 53 has reached the target completion pressure Pe, but not limited thereto, for example, in a case where the filling rate (SOC) of the fuel gas preset in accordance with the pressure of the fuel gas and the temperature of the fuel gas becomes a predetermined value, the filling may be determined to be completed. Further, when the pressure in the filled tank becomes close to the target completion pressure at the filling from the high pressure accumulator (third accumulator 2C), a difference in pressure between the accumulator and the tank becomes small to lower the flow rate. In a case where the flow rate is equal to or less than the flow rate lower limit or continues to be equal to or less than the flow rate lower limit for a predetermined time, the filling may be completed or may move to the direct filling.

In a case where in S9 (A) "NO" determination is made, that is, it is determined that the pressure in the filled tank 53 has not reached the target completion pressure Pe, the process goes back before S7 (A), wherein the processing after S7 (A) is repeated. On the other hand, in a case where in S9 (A) "YES" determination is made, that is, it is determined that the pressure in the filled tank 53 has reached the target completion pressure Pe, the process goes via "C" in FIG. 4 and "C" in FIG. 5 to the process of coordinate return of S41 in FIG. 5. When the process of coordinate return of S41 to be described later is executed, the process goes to S10 (A), wherein depressurization in the hose is carried out.

That is, in S10 (A) the depressurization valve 34A is temporarily opened to release the hydrogen gas on the filling hose 25A-side and reduce the pressure in the filling hose 25A. In subsequent S11 (A) it is determined whether or not the filling nozzle 26A is returned back to the nozzle retainer 35A. In a case where in S11 (A) it is determined that the filling nozzle 26A is returned back to the nozzle retainer 35A, the process goes to S12 (A). In S12 (A) the adjustment is made. That is, the integrated control panel 9 determines whether or not a withdrawal quantity (equivalent to an oil supply quantity) of hydrogen gas fuel found by integrating flow rate pulses from the flowmeter 30A during the filling is paid out. In a case where in S12 (A) it is determined that the adjustment is made, the processing of DSP-A is completed. That is, the processing is in the waiting state for waiting for the start of the processing of DSP-A in FIG. 3. It should be noted that whether paid out or not may be determined by an outside adjuster (POS or the like). For example, the integrated control panel 9 may transmit the information of the filling quantity to the adjuster by communication and receive the information on whether paid or not from the adjuster.

Figure 4:
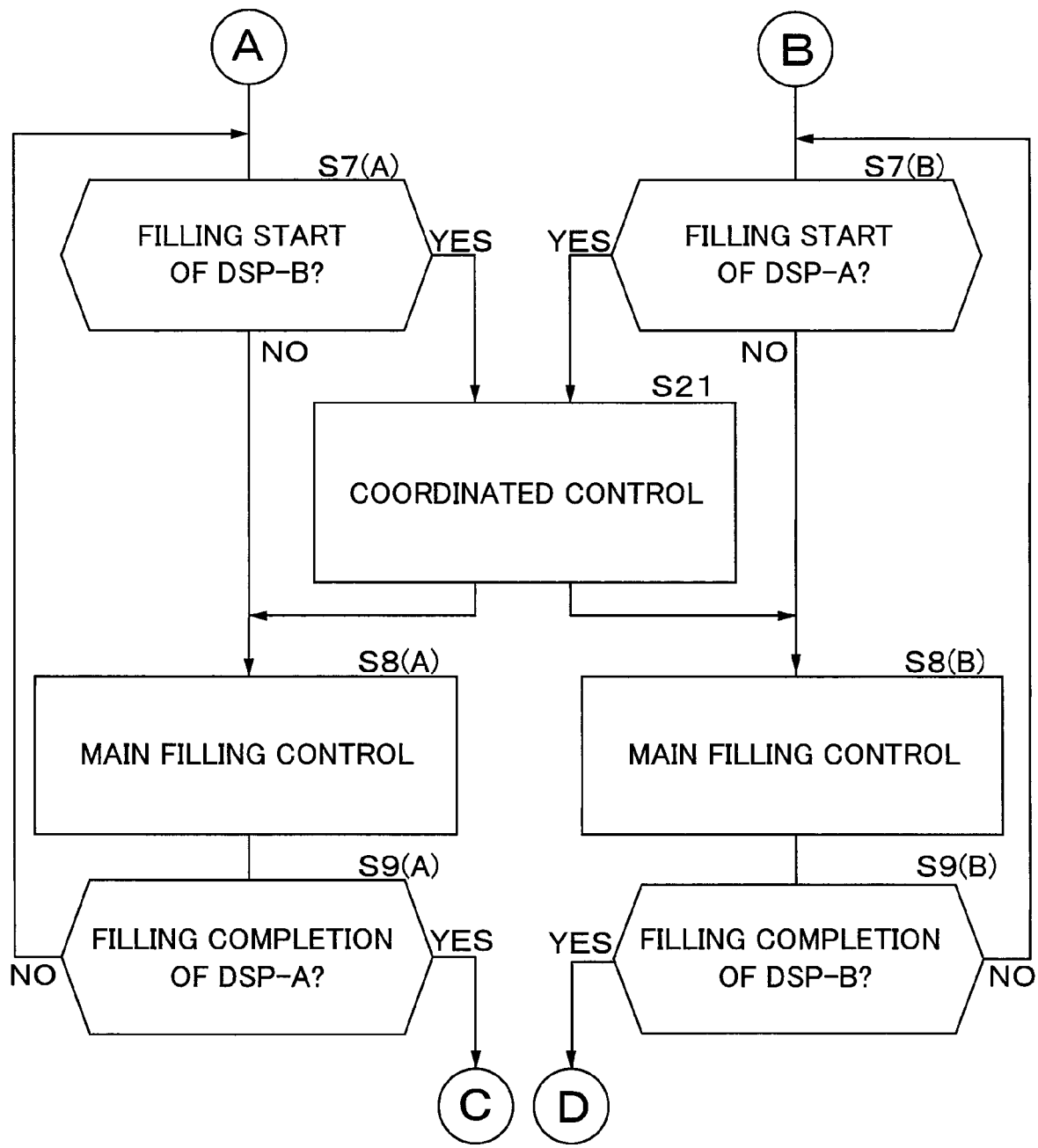
FIG. 4 is a flow chart showing the processing following "A" and "B" in FIG. 3.
Figure 6:
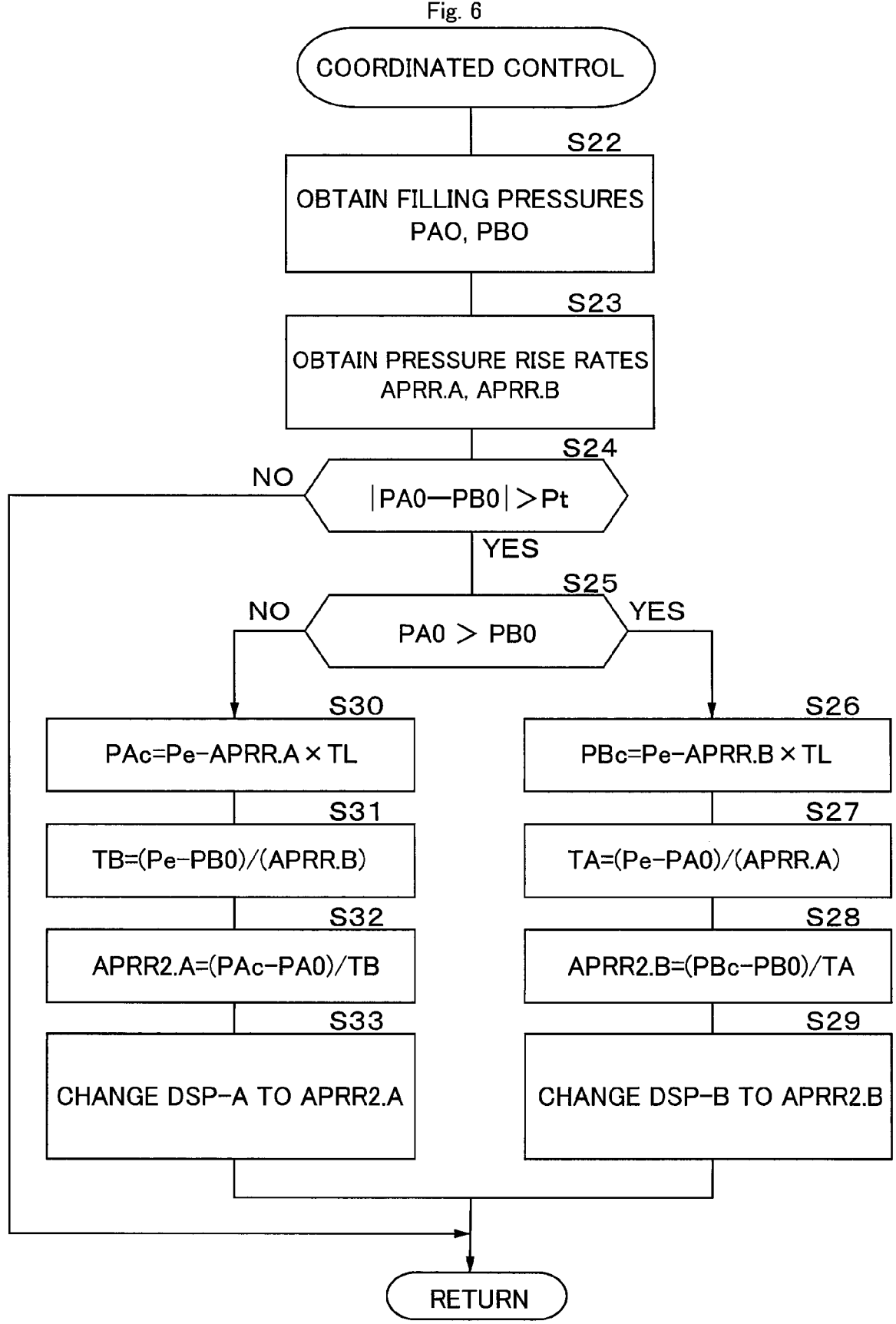
FIG. 6 is a flow chart showing the processing of "coordinated control" of S21 in FIG. 4.

Next, an explanation will be made of the process of S21 in FIG. 4, that is, the coordinated control process. When "YES" determination is made in S7 (A) in FIG. 4 or When "YES" determination is made in S7 (B), the process goes to the coordinated control process of S21. FIG. 6 shows the coordinated control process of S21. When the process of S21 is started, the process goes to S22. In S22 the filling pressures PA0, PB0 are obtained. That is, in S22 the pressure PA0 in the first filled tank 53 and the pressure PB0 in the second filled tank 54 at the time of going to S21 are obtained. The pressures PA0, PB0 respectively are the pressures (filling pressures) of the filled tanks 53, 54 at the time of starting the filling (simultaneous filling) of the hydrogen gas into both of the first filled tank 53 and the second filled tank 54 or the control target pressures at the present time (target pressures at the simultaneous filling start point).

Figure 3:
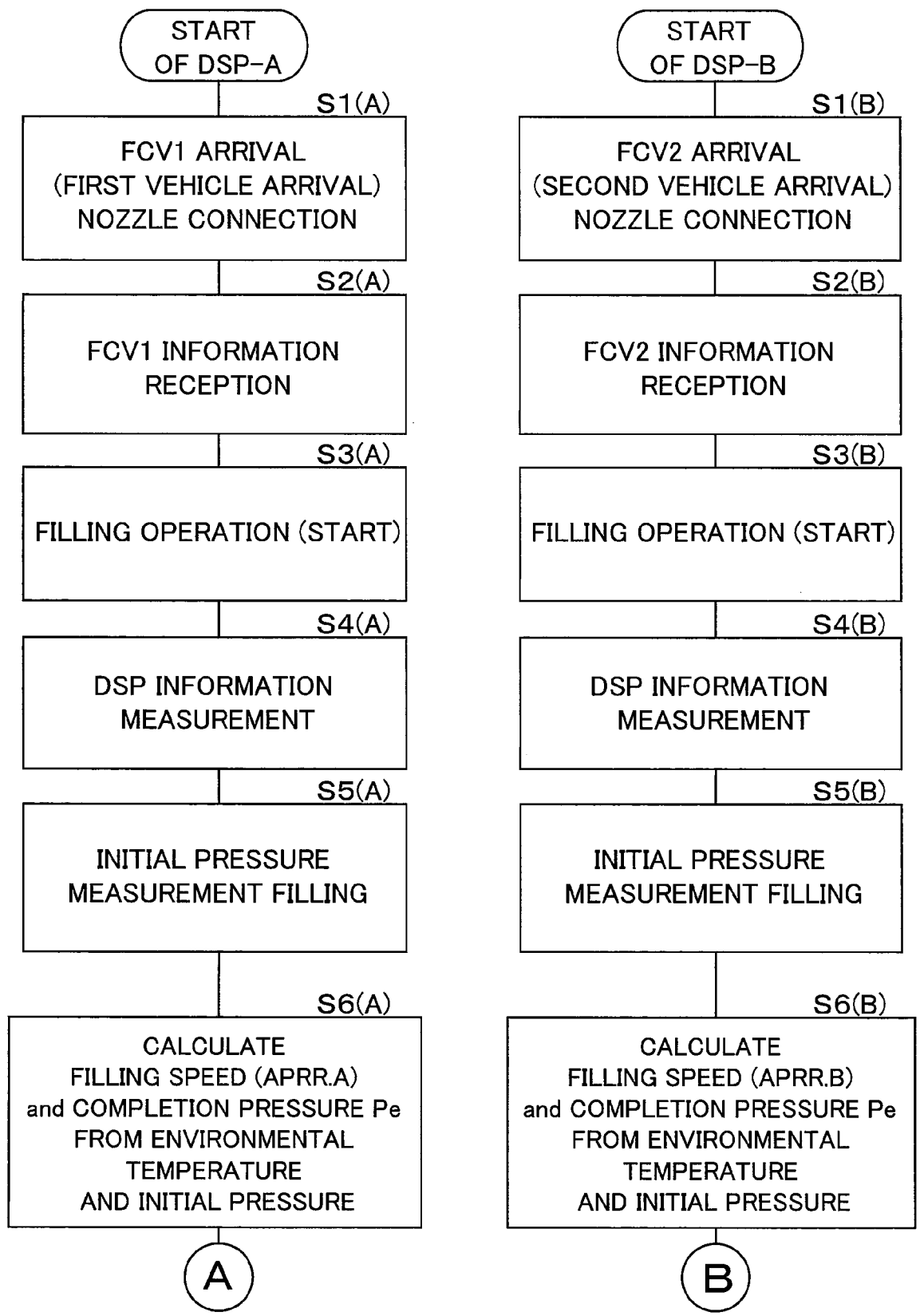
FIG. 3 is a flow chart showing the processing to be executed by an integrated control panel (a control device) in FIG. 1.

In subsequent S23, the pressure rise rates APRR.A and APRR.B are obtained. That is, in S23 the reference pressure rise rates APRR.A calculated in S6 (A) in FIG. 3 and the reference pressure rise rates APRR.B calculated in S6 (B) in FIG. 3 are obtained. In subsequent S24 it is determined whether or not the pressure rise rate of the first filled tank 53 or the pressure rise rate of the second filled tank 54 is changed from the reference pressure rise rate APRR.A or the reference pressure rise rate APRR.B. That is, in S24 it is determined whether or not an absolute value of a difference between the pressure of the first filled tank 53 and the pressure of the second filled tank 54 (|PA−PB|) is larger than a predetermined value Pt. In a case where in S24 "NO" determination is made, that is, it is determined that the pressure difference (|PA-PBJ) is equal to or less than the predetermined value Pt, the process goes to "Return". That is, the process goes via "Return" in FIG. 6 to S8 (A) and S8 (B) in FIG. 4.

On the other hand, in a case where in S24 "YES" determination is made, that is, it is determined that the pressure difference (|PA−PB|) is larger than the predetermined value Pt, the process goes to S25. In S25 the pressures PA0, PB0 obtained in S22 are compared. Specifically it is determined whether or not the pressure PA0 of the first filled tank 53 is larger than the pressure PB0 of the second filled tank 54. In a case where in S25 "YES" determination is made, that is, it is determined that the pressure PA0 of the first filled tank 53 is larger than the pressure PB0 of the second filled tank 54, the process goes to S26. In this case, the first filled tank 53 becomes a high pressure-side filled tank and the second filled tank 54 becomes a low pressure-side filled tank. In addition, the pressure rise rate APRR2.B of the second filled tank 54 is calculated in the processes S26 to S28.

That is, in S26 in a case of assuming that the filling is executed into the second filled tank 54 in the reference pressure rise rates APRR.B according to the aforementioned Formula 1, the pressure PBc for becoming the filling completion pressure Pe in a preset delay time TL is found. In subsequent S27, according to the aforementioned Formula 2, the time TA until the filling of the first filled tank 53 is completed, that is, the time TA until the pressure in the first filled tank 53 reaches the target completion pressure Pe in a case where the filling is executed into the first filled tank 53 in the reference pressure rise rates APRR.A is found. In subsequent S28, according to the aforementioned Formula 3, calculated is the pressure rise rate APRR2.B of the second filled tank 54, that is, the pressure rise rate APRR2.B in which the pressure in the second filled tank 54 changes from the pressure PB0 at the simultaneous filling start time to the pressure PBc for the time TA. In subsequent S29, the pressure rise rate of the second filled tank 54 is changed from the reference pressure rise rate APRR.B to the pressure rise rate APRR2.B calculated in S28, and the process goes to "Return". That is, the process goes via "Return" in FIG. 6 to S8 (A) and S8 (B) in FIG. 4.

On the other hand, in a case where in S25 "NO" determination is made, that is, it is determined that the pressure PA0 of the first filled tank 53 is equal to or less than the pressure PB0 of the second filled tank 54, the process goes to 530. It should be noted that the processes of S30 to S33 are similar to the processes of S26 to S29 other than being different in a point where the high pressure-side filled tank is the second filled tank 54 and the low pressure-side filled tank is the first filled tank 53. That is, the processes of S30 to S33 are similar to the processes of S26 to S29 other than being different in a point of calculating the pressure rise rate APRR2.A lower than the reference pressure rise rate APRR.A as the pressure rise rate of the first filled tank 53 and changing the pressure rise rate of the first filled tank 53 from the reference pressure rise rate APRR.A to the pressure rise rate APRR2.A calculated in S32. Therefore, the processes of S30 to S33 are omitted.

Figure 5:
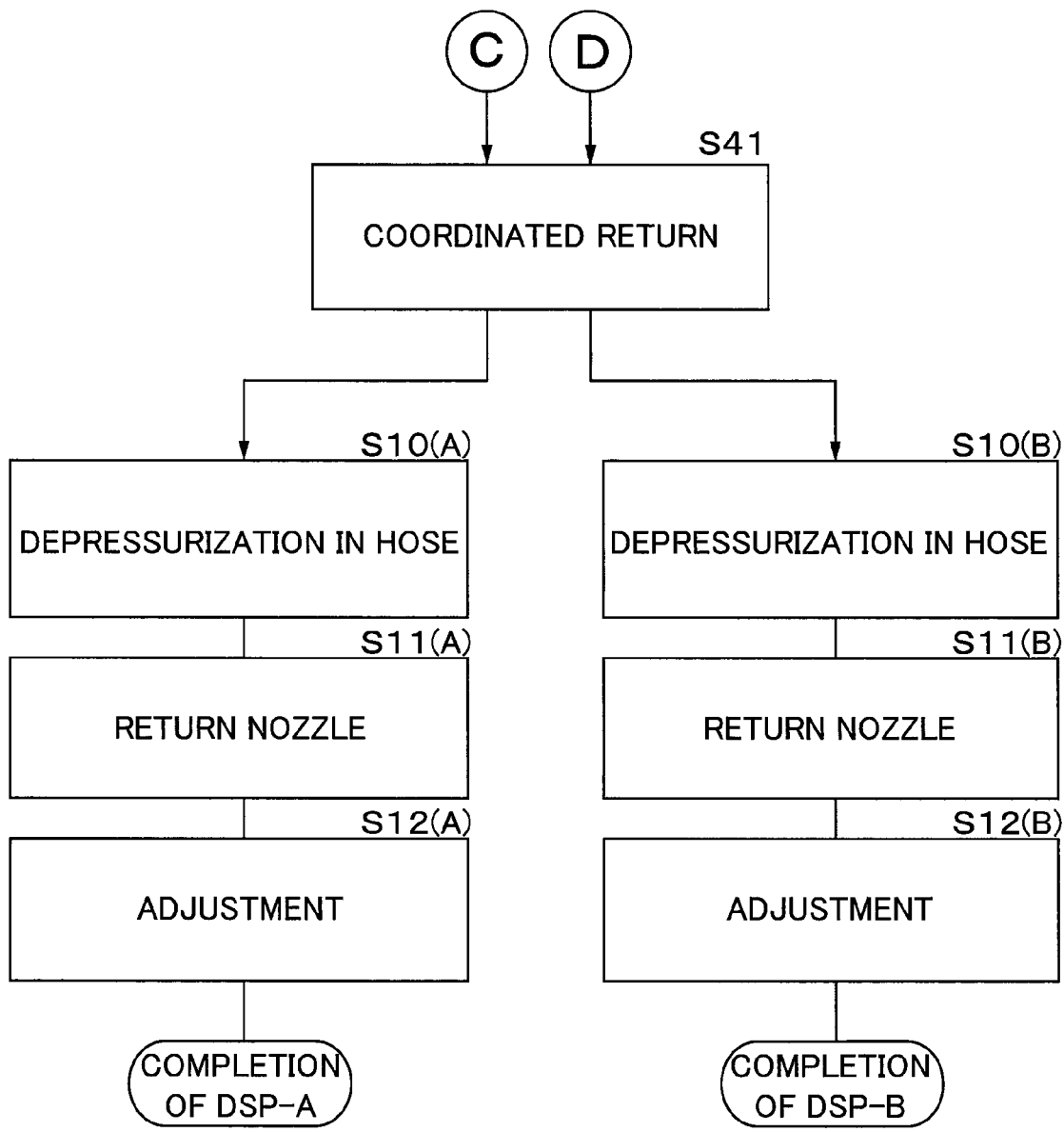
FIG. 5 is a flow chart showing the processing following "C" and "D" in FIG. 4.
Figure 7:
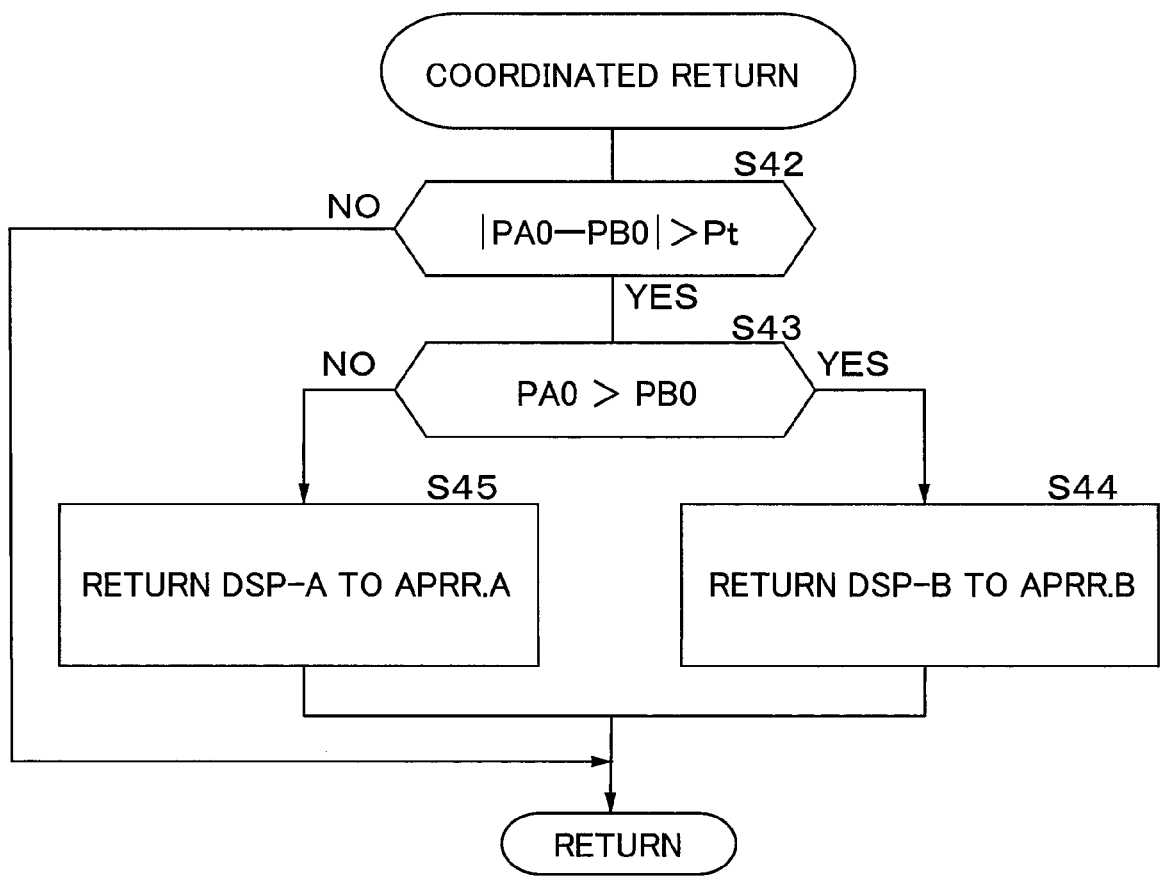
FIG. 7 is a flow chart showing the processing of "coordinated return" of S41 in FIG. 5.

Next, an explanation will be made of the process of S41 in FIG. 5, that is, the coordinated return process. In the coordinated return process, the pressure rise rate changed in the coordinated control process in S21 in FIG. 4 (more specifically, S29 to S33 in FIG. 6) is returned to the reference pressure rise rate. That is, when "YES" determination is made in S9 (A) in FIG. 4 or When "YES" determination is made in S9 (B), the process goes to the coordinated return process of S41 in FIG. 5. FIG. 7 shows the coordinated return process of S41. When the process of S41 is started, the process goes to S42. In S42 it is determined whether or not a difference between the pressure of the first filled tank 53 and the pressure of the second filled tank 54 (|PA−PB|) is larger than a predetermined value Pt. In a case where in S42 "NO" determination is made, that is, it is determined that the pressure difference (|PA-PBJ) is equal to or less than the predetermined value Pt, the process goes to "Return" without via the processes of S43 to 545. That is, the process goes via "Return" in FIG. 7 to S10 (A) or S10 (B) in FIG. 5. In this case, when the process goes from S9 (A) in FIG. 4 to S41 in FIG. 5, the process goes to S10 (A) in FIG. 5, and when the process goes from S9 (B) in FIG. 4 to S41 in FIG. 5, the process goes to S10 (B) in FIG. 5.

On the other hand, in a case where in S42 "YES" determination is made, that is, it is determined that the pressure difference (|PA−PB|) is larger than the predetermined value Pt, the process goes to S43. In S43 it is determined whether or not the pressure PA0 of the first filled tank 53 obtained in S22 is larger than the pressure PB0 of the second filled tank 54 obtained in S22 likewise. In a case where in S43 "YES" determination is made, in S44 the pressure rise rate of the second filled tank 54 is returned to the reference pressure rise rate APRR.B, and the process goes to "Return". Because of this, the pressure rise rate of the second filled tank 54 in the middle of being filled in the pressure rise rate APRR2.B becomes the reference pressure rise rate APRR.B, and the filling into the second filled tank 54 continues to be executed in the reference pressure rise rate APRR.B. In a case where in S43 "NO" determination is made, in S45 the pressure rise rate of the first filled tank 53 is returned to the reference pressure rise rate APRR.A, and the process goes to "Return". Thereby, the pressure rise rate of the first filled tank 53 in the middle of being filled in the pressure rise rate APRR2.A becomes the reference pressure rise rate APRR.A, and the filling into the first filled tank 53 continues to be executed in the reference pressure rise rate APRR.A.

As described above, according to the first embodiment the integrated control panel 9, at the time of filling the hydrogen gas into both of the first filled tank 53 and the second filled tank 54 from the multistage accumulator 2, sets the pressure rise rate of the first filled tank 53 or the pressure rise rate of the second filled tank 54 to be lower than the reference pressure rise rate APRR.A or the reference pressure rise rate APRR.B in accordance with the difference between the pressure PA0 of the first filled tank 53 and the pressure PB0 of the second filled tank 54. Therefore, at the time of filling the hydrogen gas into both of the first filled tank 53 and the second filled tank 54 from the multistage accumulator 2, it is possible to suppress the time until the filling of the hydrogen gas into the filled tank on the high pressure side (for example, the first filled tank 53) is completed from being longer or the filling of the hydrogen gas from ending halfway.

That is, at the time of filling the hydrogen gas into both of the first filled tank 53 and the second filled tank 54 from the multistage accumulator 2, there will be considered a case where a difference between the pressure of the first filled tank 53 and the pressure of the second filled tank 54 is large and a difference between the pressure of the filled tank on the higher pressure side and the pressure of the multistage accumulator 2 is small. In this case, there is a possibility that the hydrogen gas is difficult to be filled into the filled tank on the higher pressure side and the pressure in the filled tank on the higher pressure side is difficult to rise. In more detail, in a case where a difference between the pressure in the filled tank on the higher pressure side and the pressure in the third accumulator 2C as the high pressure accumulator of the multistage accumulator 2 is small, when the hydrogen gas is supplied into both of the first filled tank 53 and the second filled tank 54 from the third accumulator 2C, there is a possibility that the hydrogen gas is difficult to be filled into the filled tank on the higher pressure side and the pressure in the filled tank on the higher pressure side is difficult to rise. As a result, there is a possibility that the time until the filling of the hydrogen gas into the filled tank on the higher pressure side is completed gets longer or the filling of the hydrogen gas ends halfway.

Therefore, in the first embodiment, as shown in FIG. 8, at the time of filling the hydrogen gas into both of the first filled tank 53 and the second filled tank 54 from the multistage accumulator 2, the pressure rise rate of the filled tank on the lower pressure side (for example, the second filled tank 54) is made to be lower than the reference pressure rise rate APRR.B (to be APRR2.B). Thereby, the filling of the hydrogen gas can continue to be executed while maintaining the pressure rise rate of the filled tank on the higher pressure side (for example, the first filled tank 53) as the reference pressure rise rate APRR.A. In this case, as switching points of the accumulators 2A, 2B, 2C are indicated at "A" in FIG. 8, the hydrogen gas is not supplied into both of the first filled tank 53 and the second filled tank 54 from the third accumulator 2C as the high pressure accumulator.

That is, in the first embodiment the low pressure-side filled tank (for example, the second filled tank 54) reaches the target completion pressure Pe after the predetermined time TL elapses from a point when the high pressure-side filled tank (for example, the first filled tank 53) reaches the target completion pressure Pe. In addition, the predetermined time TL is set to a time for which the pressure rise rate of the high pressure-side filled tank (for example, the first filled tank 53) can be maintained as the reference pressure rise rate APRR.A. In other words, the predetermined time TL is set as a time to the extent that the hydrogen gas is not supplied into both of the first filled tank 53 and the second filled tank 54 from the third accumulator 2C of the multistage accumulator 2 when the high pressure-side filled tank (for example, the first filled tank 53) becomes close to the target completion pressure Pe.

Therefore, it is possible to suppress the time until the filling of the hydrogen gas into the filled tank on the higher pressure side (for example, the first filled tank 53) is completed from being longer or the filling of the hydrogen gas from ending halfway. In addition, since a preliminary accumulator is not necessary in the first embodiment, the cost can be reduced. In addition, in the first embodiment when an operation of the filling start is made, the filling is always started (the state where the filling is not executed is not present). Therefore, it is possible to suppress giving a strange feeling and a discomfort feeling (irritation feeling) to a worker who executes the filling work of the hydrogen gas. Further, the delay of the filling into the lower pressure-side filled tank (for example, the second filled tank 54) can be controlled to the minimum necessary to suppress the filling time from being wastefully delayed.

In the first embodiment the reference pressure rise rate APRR.A or APRR.B is defined as the pressure rise rate at the time of filling the hydrogen gas into only one of the first filled tank 53 and the second filled tank 54 from the multistage accumulator 2. Therefore, at the time of filling the hydrogen gas into both of the first filled tank 53 and the second filled tank 54, the pressure rise rate APRR2.B of the filled tank on the lower pressure side (for example, the second filled tank 54) becomes lower than the reference pressure rise rate APRR.B at the time of filling the hydrogen gas into only the second filled tank 54 from the multistage accumulator 2.

In the first embodiment, when the filling into the higher pressure-side filled tank (for example, the first filled tank 53) is completed, the pressure rise rate of the filled tank on the lower pressure side (for example, the second filled tank 54) is made to the reference pressure rise rate APRR.B. Therefore, it is possible to shorten the time for which the supply of the hydrogen gas into the filled tank on the lower pressure side (for example, the second filled tank 54) is completed as compared to a case of a state where the pressure rise rate of the filled tank on the lower pressure side (for example, the second filled tank 54) is kept to be lowered (kept to be APRR2.B).

In the first embodiment, it is determined whether or not the pressure rise rate is made lower than the reference pressure rise rate, in accordance with the pressure in the first filled tank 53 and the pressure in the second filled tank 54. Therefore, in a case where a difference between the pressure of the first filled tank 53 and the pressure of the second filled tank 54 (|PA−PB|) is larger than a predetermined value Pt, the pressure rise rate of the filled tank on the lower pressure side (for example, the second filled tank 54) can be made lower than the reference pressure rise rate. On the other hand, in a case where the difference between the pressure of the first filled tank 53 and the pressure of the second filled tank 54 (|PA−PB|) is equal to or less than the predetermined value Pt, the pressure rise rate of the first filled tank 53 and the pressure rise rate of the second filled tank 54) can be kept to be the reference pressure rise rate APRR.A or APRR.B.

Figure 9:
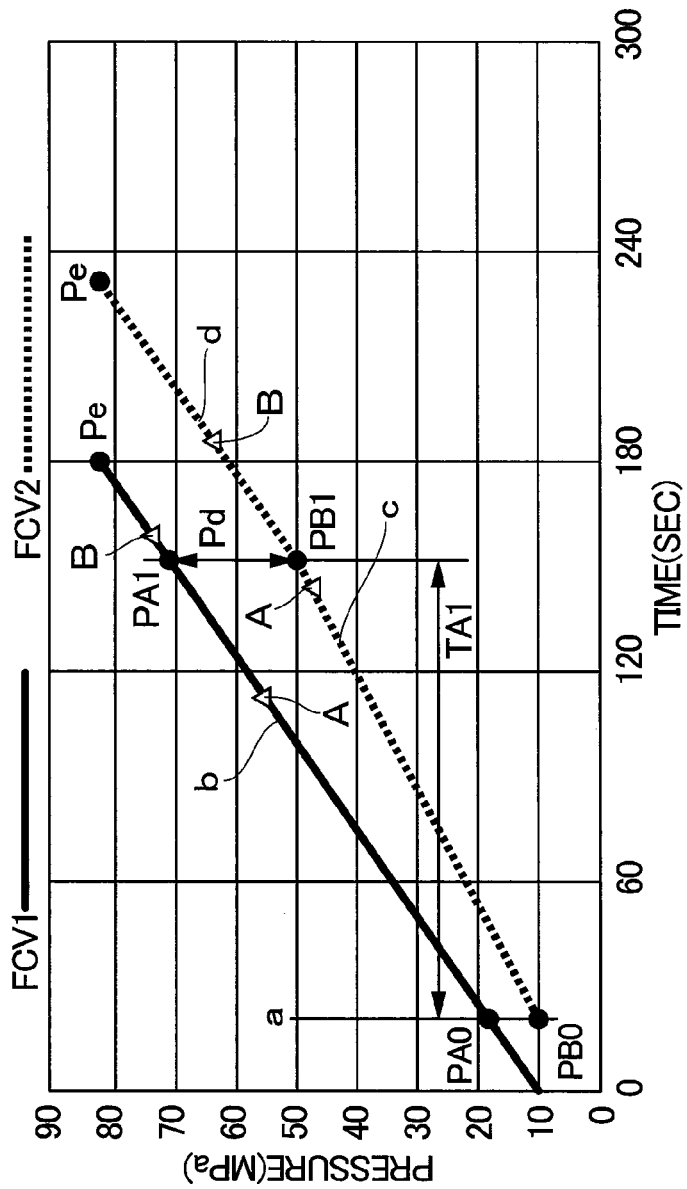
FIG. 9 is a characteristic diagram showing an example of a time change in pressure of a first filled tank and an example of a time change in pressure of a second filled tank according to a second embodiment.

Next, FIG. 9 shows a second embodiment. The second embodiment is characterized in that a pressure rise rate of a filled tank on the lower pressure side is made lower than a reference pressure rise rate so that a pressure in the filled tank on the lower pressure side is lower by a second predetermined pressure than a first predetermined pressure when a pressure in a filled tank on the higher pressure side reaches the predetermined pressure. It should be noted that in the second embodiment, components identical to those in the above-described first embodiment are referred to as identical reference numbers and an explanation thereof is omitted.

As shown in FIG. 9, in the second embodiment, when the simultaneous filling is executed to two vehicles, the integrated control panel 9 finds a filling time TA1 in which a pressure in the first filled tank 53 on the higher pressure side at the simultaneous filling start time reaches a preset first predetermined pressure PA1. That is, the filling time TA1 is calculated according to the following Formula 4.

$$TA1 = \frac{PA1 - PA0}{APRR.A} \quad \text{[Formula 4]}$$

The integrated control panel 9 finds, as the pressure rise rate of the second filled tank 54 on the lower pressure side at the simultaneous filling start time, a pressure rise rate APRR2.B so that the pressure in the second filled tank 54 becomes a pressure PB1 (called as a target pressure PB1 as well) lower by a second predetermined pressure Pd than a first predetermined pressure PA1 after the filling time TA1 calculated in Formula 4. That is, the pressure rise rate APRR2.B is calculated according to the following Formula 5.

$$APRR2.B = \frac{PB1 - PB0}{TA1} \quad \text{[Formula 5]}$$

The integrated control panel 9 executes the filling into the second filled tank 54 in the pressure rise rate APRR2.B until the pressure in the second filled tank 54 reaches the target pressure PB1. The integrated control panel 9, when the pressure in the second filled tank 54 reaches the target pressure PB1, executes the filling into the second filled tank 54 in the reference pressure rise rate APRR.B. It should be noted that the integrated control panel 9 may execute the filling into the second filled tank 54 in the reference pressure rise rate APRR.B when the filling into the first filled tank 53 is completed.

That is, in the second embodiment the filling is executed by setting the filling speed of the second filled tank 54 (filling speed) to be lower than the reference filling speed (the reference pressure rise rate APRR.B). In addition, in a case where the pressure in the second filled tank 54 reaches the target pressure PB1 or in a case where the filling into the first filled tank 53 is completed, the filling speed of the second filled tank 54 (filling speed) is returned to the reference filling speed (reference pressure rise rate APRR.B)

Thereby, at the end of the filling a pressure difference of the second predetermined pressure Pd is ensured between the first filled tank 53 and the second filled tank 54. The first predetermined pressure PA1 and the second predetermined pressure Pd (that is, the pressure difference Pd) are set so that the hydrogen gas is not supplied into both of the first filled tank 53 and the second filled tank 54 from the third accumulator 2C as the high pressure accumulator of the multistage accumulator 2. In addition, for example, in a case of executing the direct filling through the direct filling pipeline 22 at the final stage of the filling, the first predetermined pressure PA1 and the second predetermined pressure Pd (that is, the pressure difference Pd) are set so that the hydrogen gas is not supplied into both of the first filled tank 53 and the second filled tank 54 from the direct filling pipeline 22. For example, the first predetermined pressure PA1 can be set to a pressure smaller than a pressure switched from the second accumulator 2B to the third accumulator 2C (or a pressure switched to the direct filling through the direct filling pipeline 22). In addition, the second predetermined pressure Pd, when there is the pressure difference Pd, can be set to the pressure so that the filling into the higher pressure-side filled tank is completed before the accumulator for the filling into the lower pressure-side filled tank is switched from the second accumulator 2B to the third accumulator 2C.

In this way, in the second embodiment the integrated control panel 9, at the time of executing the simultaneous filling to a plurality of vehicles, finds a filling time TA1 in which the filling pressure in the first vehicle 51 as a vehicle of which a filling pressure is higher becomes a first predetermined pressure PA1 preset. The integrated control panel 9 finds a second filling speed (pressure rise rate APRR2.B) in which a filling pressure in the second vehicle 52 as a vehicle of which the filling pressure is lower becomes the pressure PB1 lower by the preset pressure difference Pd than the first predetermined pressure PA1 after the filling time TA1. The integrated control panel 9 executes the filling into the second vehicle 52 in the second filling speed (pressure rise rate APRR2.B) during the simultaneous filling. The integrated control panel 9 executes the filling into the second vehicle 52 in the reference filling speed (reference pressure rise rate APRR.B) when the filling time TA1 elapses or when the filling into the first vehicle 51 is completed.

The second embodiment executes the filling as described above, and a basic function thereof is not particularly different from that in the first embodiment as described above. Particularly in the second embodiment the integrated control panel 9 sets the pressure rise rate of the lower pressure-side filled tank (for example, the second filled tank 54) to be lower than the reference pressure rise rate APRR.B so that the pressure in the lower pressure-side filled tank (for example, the second filled tank 54) is lower by the second predetermined pressure Pd than the first predetermined pressure PA1 when the pressure in the higher pressure-side filled tank (for example, the first filled tank 53) reaches the first predetermined pressure PA1.

In this case, the first predetermined pressure PA1 and the second predetermined pressure Pd (pressure difference Pd) are set to pressures that enable the pressure rise rate of the high pressure-side filled tank (for example, the first filled tank 53) to be maintained to the reference pressure rise rate APRR.A. In other words, the first predetermined pressure PA1 and the second predetermined pressure Pd (pressure difference Pd) are set as a time to the extent that the hydrogen gas is not filled into both of the first filled tank 53 and the second filled tank 54 from the third accumulator 2C of the multistage accumulator 2 when the high pressure-side filled tank (for example, the first filled tank 53) becomes close to the target completion pressure Pe. Therefore, the second embodiment also, as similar to the first embodiment, can suppress the time until the filling of the hydrogen gas into the filled tank on the higher pressure side (for example, the first filled tank 53) is completed from being longer or the filling of the hydrogen gas from ending halfway.

Figure 10:
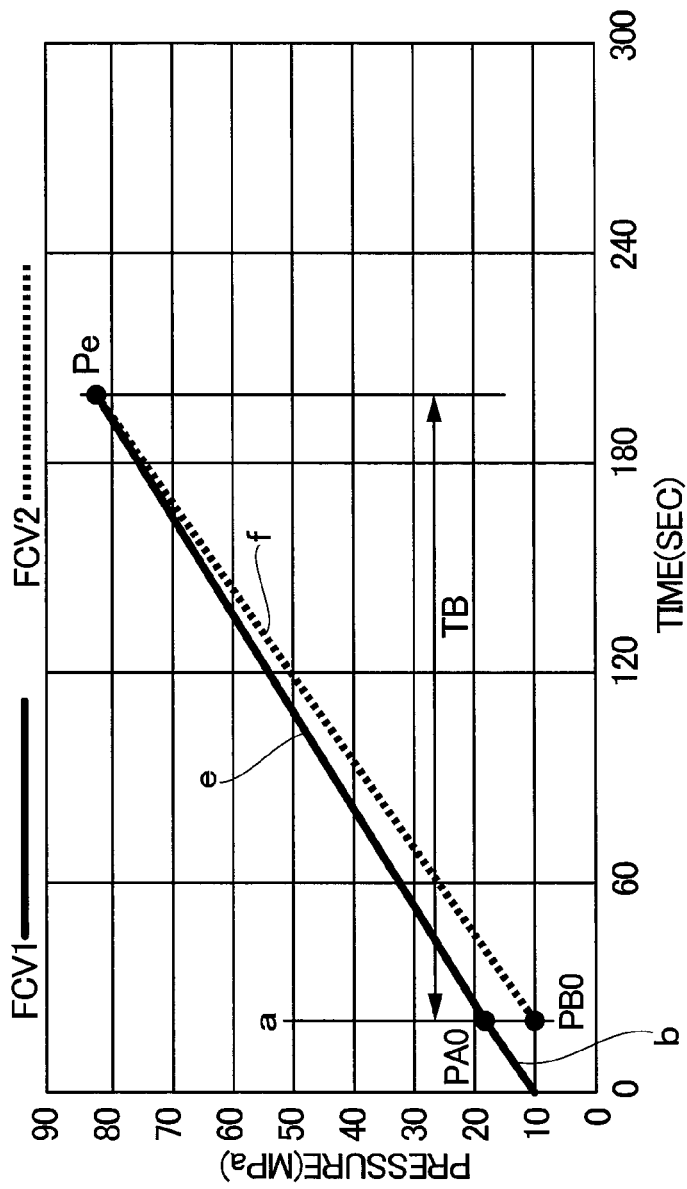
FIG. 10 is a characteristic diagram showing an example of a time change in pressure of a first filled tank and an example of a time change in pressure of a second filled tank according to a third embodiment.

Next, FIG. 10 shows a third embodiment. The third embodiment is characterized in that a pressure rise rate of a filled tank on the higher pressure side is made lower than a reference pressure rise rate so that a pressure in the filled tank on the higher pressure side and a pressure in a filled tank on the lower pressure side reach a target completion pressure at the same time. It should be noted that in the third embodiment, components identical to those in the above-described first embodiment are referred to as identical reference numbers and an explanation thereof is omitted.

As shown in FIG. 10, in the third embodiment, when the simultaneous filling is executed to two vehicles, the integrated control panel 9 finds a filling time TB until the pressure in the second filled tank 54 on the lower pressure side at the simultaneous filling start time reaches a target completion pressure Pe. That is, the filling time TB is calculated according to the following Formula 6.

$$TB = \frac{Pe - PB0}{APRR.B} \quad \text{[Formula 6]}$$

The integrated control panel 9 finds, as the pressure rise rate of the first filled tank 53 on the higher pressure side at the simultaneous filling start time, a pressure rise rate APRR2.A so that the pressure in the first filled tank 53 reaches a target completion pressure Pe in the filling time TB according to the Formula 6. That is, the pressure rise rate APRR2.A is calculated according to the following Formula 7.

$$APRR2.A = \frac{Pe - PA0}{TB} \quad \text{[Formula 7]}$$

The integrated control panel 9 executes, when the filling into the second filled tank 54 is started, the filling into the first filled tank 53 in the pressure rise rate APRR2.A. The integrated control panel 9 executes the filling into the second filled tank 54 in the pressure rise rate APRR.B. Thereby, the integrated control panel 9 can set the pressure in the first filled tank 53 and the pressure in the second filled tank 54 to reach the target completion pressure Pe at the same time and can complete the filling at the same time. With this simultaneous completion control, the filling by which the pressure difference between the multistage accumulator 2 and the filled tanks 53, 54 is made to be small, that is, the filling by the third accumulator 2C as the high pressure accumulator can be executed in the substantially identical filling pressure. In addition, in a case of executing the direct filling through the direct filling pipeline 22 at the final stage of the filling, the direct filling from the direct filling pipeline 22 can be executed in the substantially identical filling pressure. Further, since the filling pressure difference can be reduced, the hydrogen gas can equally be filled to the two vehicles 51, 52 (the two filled tanks 53, 54)

In this way, in the third embodiment the integrated control panel 9 finds, as the filling speed (pressure rise rate) in the first vehicle 51 as a vehicle on the higher filling pressure side at the time of executing the simultaneous filling in a plurality of vehicles, a filling speed (pressure rise rate APRR2.A) so that the filling in the second vehicle 52 as a vehicle on the lower filling pressure side and the filling in the first vehicle 51 are completed simultaneously. The integrated control panel 9 executes the filling to the first vehicle 51 in the found filling speed (pressure rise rate APRR2.A) during the simultaneous filling and executes the filling to the second vehicle 52 in the reference filling speed (reference pressure rise rate APRR.B).

The third embodiment executes the filling as described above, and a basic function thereof is not particularly different from that in the first embodiment and the second embodiment. Particularly in the third embodiment the integrated control panel 9 sets the pressure rise rate of the higher pressure-side filled tank (for example, the first filled tank 53) to be lower than the reference pressure rise rate APRR.A so that the pressure in the higher pressure-side filled tank (for example, the first filled tank 53) and the pressure in the lower pressure-side filled tank (for example, the second filled tank 54) reach the target completion pressure Pe at the same time.

Therefore, in the third embodiment the pressure in the higher pressure-side filled tank (for example, the first filled tank 53) and the pressure in the lower pressure-side filled tank (for example, the second filled tank 54) reach the target completion pressure Pe at the same time. Therefore, when the filling of the hydrogen gas is executed into both of the higher pressure-side filled tank (for example, the first filled tank 53) and the lower pressure-side filled tank (for example, the second filled tank 54) from the third accumulator 2C as the high pressure accumulator at the final stage of the filling, the filling can be executed in the substantially same pressure. That is, the filling can equally be executed to the two vehicles 51, 52 (into the two filled tanks 53, 54).

It should be noted that the aforementioned first embodiment and second embodiment are explained by taking as an example, in a case where the difference between the pressure in the first filled tank 53 and the pressure in the second filled tank 54 (|PA−PB|) is equal to or less than the predetermined value Pt at the time of starting the simultaneous filling, a case of setting the pressure rise rate of the first filled tank 53 and the pressure rise rate of the second filled tank 54 to be the reference pressure rise rates APRR.A and APRR.B respectively. However, not limited thereto, for example, in a case where the difference between the pressure in the first filled tank 53 and the pressure in the second filled tank 54 (|PA−PB|) is equal to or less than the predetermined value Pt at the time of starting the simultaneous filling, the pressure rise rate of the higher pressure-side filled tank may be similar to the third embodiment.

That is, in a case where the pressure difference (|PA-PBJ) is equal to or less than the predetermined value Pt, the integrated control panel 9 may set the pressure rise rate of the higher pressure-side filled tank (for example, first filled tank 53) to be lower than the reference pressure rise rate APRR.A so that the pressure in the higher pressure-side filled tank (for example, the first filled tank 53) and the pressure in the lower pressure-side filled tank (for example, the second filled tank 54) reach the target completion pressure Pe at the same time. In this case, an adjustment width of the pressure rise rate (degree of lowering the pressure rise rate) can be made small and the hydrogen gas can substantially equally be supplied to the high pressure-side filled tank and the low pressure-side filled tank.

Figure 11:
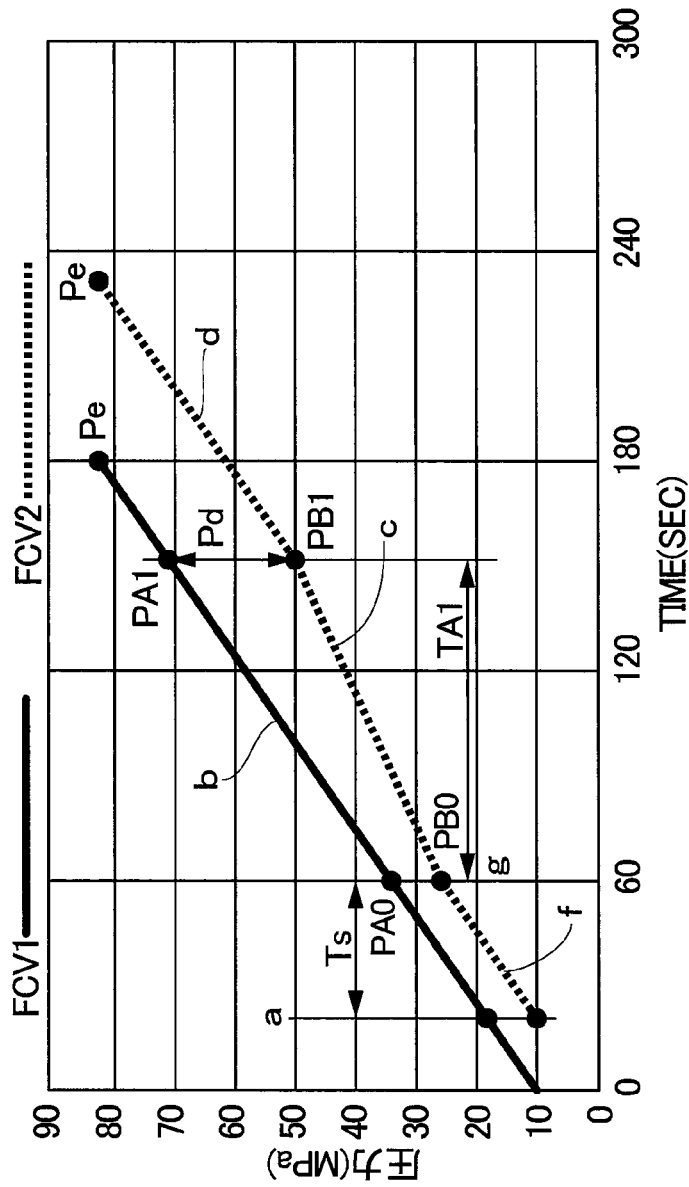
FIG. 11 is a characteristic diagram showing an example of a time change in pressure of a first filled tank and an example of a time change in pressure of a second filled tank according to a modification example.

In addition, the first embodiment to the third embodiment are explained by taking as an example a case where the pressure rise rate is made lower than the reference pressure rise rate from the starting point of the simultaneous filling. However, not limited thereto, as a modification example as shown in FIG. 11, pressures PA0, PB0 of the filled tanks 53, 54 are respectively measured in a point when a predetermined time Ts elapses from the start of the simultaneous filling, and the pressure rise rate of the lower pressure-side filled tank (for example, second filled tank 54) may be lower than the reference pressure rise rate from this point. That is, the timing for changing the pressure rise rate may be delayed by the predetermined time Ts. As a result, a pressure rise rate at the initial time of the filling can be set to a predetermined state (reference pressure rise rate) and a temperature (pre-cool temperature) of the hydrogen gas can be maintained in a specified temperature (temperature for being capable of suppressing an excess rise of a temperature of the filled tank).

That is, when the pressure rise rate is lowered, there are some cases where a quantity of hydrogen gas to be cooled in the cooler 29 (heat exchangers 29A, 29B) is reduced, resulting in that a temperature of the hydrogen gas to be supplied to a vehicle is not cooled to a specified temperature. For example, when the pressure rise rate is lowered, there are some cases where a temperature of hydrogen gas is not cooled to a specified temperature by the time after 30 sec from the main filling start. On the other hand, in a case where the pressure rise rate is made lower than the reference pressure rise rate after a predetermined time Ts elapses from the start of the simultaneous filling, a temperature of the hydrogen gas to be supplied (filled) to a filled tank can be cooled to a specified temperature. The modification example as shown in FIG. 11 shows a case of delaying change timing of the pressure rise rate in the second embodiment by a predetermined time Ts (specifically, when the higher pressure-side filled tank reaches a predetermined pressure PA1, the change timing is delayed so that a pressure of the low pressure-side filled tank becomes a predetermined pressure PB1 lower by Pb than the pressure in the higher pressure-side filled tank), and in the first embodiment and third embodiment also, the change timing can be delayed likewise.

In addition, the first embodiment is explained by taking as an example a case of using a measurement value, that is, a detection value of a pressure sensor (more specifically, the secondary pressure sensors 32A, 32B), as pressures PA0, PB0 in the filled tanks 53, 54 obtained in S22 in FIG. 6, that is, pressures to be used at the time of executing calculation of a pressure rise rate lower than a reference pressure rise rate. However, not limited thereto, for example, a control target value calculated in the integrated control panel 9 or an estimation value detected from a sensor value, and the like may be used. The pressure (filling pressure) in the filled tank may use a pressure on the outlet side of the dispenser unit or the pressure in the filled tank (a container pressure of a fuel cell car). This can be true of the second embodiment, the third embodiment and the modification example.

In the respective embodiments and the modification example, the pressure rise rate of the first filled tank 53 or the second filled tank 54 is lowered. The pressure rise rate lowered is calculated using the pressures PA0, PB0 in the filled tanks 53, 54 at the time of starting the simultaneous filling or changing the pressure rise rate. At this time, there is a possibility that the filling speed of the hydrogen gas becomes smaller than a preset threshold value (lower limit filling speed) for stopping the filling depending upon the calculated pressure rise rate. Therefore, for example, in a case where the calculated pressure rise rate (filling speed) becomes smaller than the threshold value (lower limit filling speed) for stopping the filling, the threshold value (lower limit filling speed) is made to a different threshold value (lower limit filling speed) lower than the calculated pressure rise rate. As a result, it is possible to continue the filling of the hydrogen gas.

In addition, there is a possibility that the calculated pressure rise rate is equal to or more than an initial pressure rise rate (filling speed) determined according to a filling protocol as a predetermined standard, that is, a reference pressure rise rate (reference filling speed). In this case, the pressure rise rate (filling speed) may not be changed. For example, the pressure rise rate (filling speed) may be a reference pressure rise rate (reference filling speed). Further, in a case where a pressure in at least one filled tank of the first filled tank and the second filled tank is equal to or more than a preset filling pressure, a change in the filling speed may not be executed.

The respective embodiments and the modification example are explained by taking as an example a case of filling the compressed hydrogen gas into the filled tanks 53, 54 mounted on the vehicles 51, 52. However, for example, the filling of hydrogen gas may be executed into a filled tank (a tank, a container or the like) other than a vehicle. In addition, the dispenser unit 5 in the hydrogen gas filling device 1 may be installed in the middle of a pipeline (hydrogen gas feeding pipeline) for feeding hydrogen gas to other locations. Further, the explanation is made by taking the hydrogen gas as fuel gas as an example, but fuel gas of natural gas (NG), propane gas (LPG) and the like other than hydrogen gas may be used (in the gas filling device).

The respective embodiments and the modification example are explained by taking as an example a case of being provided with the first gas supply pipeline 7 and the second gas supply pipeline 8 as a plurality of gas supply paths. However, for example, three or more gas supply paths may be used. In addition, the respective embodiments and the modification example are explained by taking as an example the multistage accumulator 2 including the three accumulators 2A, 2B, 2C. However, not limited thereto, a multistage accumulator may include two accumulators or may include four or more accumulators. Further, one accumulator in place of a multistage accumulator may be provided, that is, one accumulator may be connected to a plurality of gas supply paths (for example, a first gas supply path and a second gas supply path).

The respective embodiments and the modification example are shown simply as examples, and partial replacement or a combination of components shown in different embodiments and modifications is possible without mentioning.

For example, aspects to be described below will be conceived as the gas filling device based upon the embodiments and the modification examples as explained above.

A gas filling device according to a first aspect comprises: a first gas supply path for supplying fuel gas into a first filled tank from an accumulator in which the fuel gas is accumulated; a second gas supply path for supplying the fuel gas into a second filled tank from the accumulator; and a control device configured to control a pressure rise rate of the fuel gas to be supplied via the first gas supply path into the first filled tank and control a pressure rise rate of the fuel gas to be supplied via the second gas supply path into the second filled tank, characterized in that when supplying the fuel gas into both of the first filled tank and the second filled tank from the accumulator, the control device sets a pressure rise rate of the first filled tank or a pressure rise rate of the second filled tank to be lower than a reference pressure rise rate in accordance with a difference in pressure between the first filled tank and the second filled tank.

According to the first aspect, at the time of supplying the fuel gas into both of the first filled tank (for example, the first filled tank mounted on the first vehicle) and the second filled tank (for example, the second filled tank mounted on the second vehicle different from the first vehicle) from the accumulator, it is possible to suppress the time until the supply of the fuel gas into the filled tank on the higher pressure side is completed from becoming longer or the supply of the fuel gas from ending halfway. That is, there will be considered a case where at the time of supplying the fuel gas into both of the first filled tank and the second filled tank from the accumulator, for example, a difference between the pressure in the first filled tank and the pressure in the second filled tank is large and a difference between the pressure in the filled tank on the higher pressure side and the pressure in the accumulator is small. In this case, there is a possibility that the fuel gas is difficult to be supplied into the filled tank on the higher pressure side and the pressure in the filled tank on the higher pressure side is difficult to rise. As a result, there is a possibility that the time until the supply of the fuel gas into the filled tank on the higher pressure side is completed becomes longer or the supply of the fuel gas ends halfway. Therefore, when supplying the fuel gas into both of the first filled tank and the second filled tank from the accumulator, a pressure rise rate of the first filled tank or a pressure rise rate of the second filled tank is made lower than a reference pressure rise rate. Therefore, by making the pressure rise rate of the filled tank on the lower pressure side lower than the reference pressure rise rate, the supply of the fuel gas can continue to be executed while maintaining the pressure rise rate of the filled tank on the higher pressure side in the reference pressure rise rate. As a result, it is possible to suppress the time until the supply of the fuel gas into the filled tank on the higher pressure side is completed from becoming longer or the supply of the fuel gas from ending halfway.

As a second aspect, in the first aspect the reference pressure rise rate, when the fuel gas is supplied into only one of the first filled tank and the second filled tank from the accumulator, includes a pressure rise rate of the one filled tank.

According to the second aspect, when the fuel gas is supplied into both of the first filled tank and the second filled tank from the accumulator, the pressure rise rate of the first filled tank or the pressure rise rate of the second filled tank can be made lower than a pressure rise rate at the time of supplying the fuel gas into only the one filled tank (reference pressure rise rate: a rise rate in a case of filling singularly).

As a third aspect, in the first aspect or in the second aspect the control device sets, in a case where the pressure rise rate of one filled tank of the first filled tank and the second filled tank is lowered from the reference pressure rise rate, when the supply of the fuel gas into the other filled tank is completed, the pressure rise rate of the one filled tank to be the reference pressure rise rate.

According to the third aspect, when the supply of the fuel gas into the other filled tank is completed, since the pressure rise rate of the one filled tank is determined to be the reference pressure rise rate, the time in which the supply of the fuel gas into the one filled tank is completed can be shortened as compared to a case where the pressure rise rate of the one filled tank is kept to be lowered.

As a fourth aspect, in any one of the first aspect to the third aspect, in a case where at the time of starting the supply of the fuel gas into both of the first filled tank and the second filled tank, the filled tank on the higher pressure side is defined as a higher pressure-side filled tank and at the time of starting the supply of the fuel gas into both of the first filled tank and the second filled tank, the filled tank on the lower pressure side is defined as a lower pressure-side filled tank, the control device sets the pressure rise rate of the lower pressure-side filled tank to be lower than the reference pressure rise rate so that the pressure of the lower pressure-side filled tank reaches a target completion pressure later by a predetermined time to the time when the pressure of the higher pressure-side filled tank reaches a target completion pressure as a pressure for stopping the supply of the fuel gas.

According to the fourth aspect, the pressure of the lower pressure-side filled tank reaches the target completion pressure (pressure for stopping the supply of the fuel gas) after the predetermined time from the time when the pressure of the higher pressure-side filled tank reaches the target completion pressure (pressure for stopping the supply of the fuel gas). Therefore, for example, by setting the predetermined time to "a time enabling the pressure rise rate of the higher pressure-side filled tank to be maintained in the reference pressure rise rate", it is possible to suppress the time until the supply of the fuel gas into the higher pressure-side filled tank is completed from becoming longer or the supply of the fuel gas from ending halfway.

As a fifth aspect, in any one of the first aspect to the third aspect, in a case where at the time of starting the supply of the fuel gas into both of the first filled tank and the second filled tank, the filled tank on the higher pressure side is defined as a higher pressure-side filled tank and at the time of starting the supply of the fuel gas into both of the first filled tank and the second filled tank, the filled tank on the lower pressure side is defined as a lower pressure-side filled tank, the control device sets the pressure rise rate of the lower pressure-side filled tank to be lower than the reference pressure rise rate so that when a pressure in the higher pressure-side filled tank reaches a first predetermined pressure, a pressure in the lower pressure-side filled tank becomes lower by a second predetermined pressure than the first predetermined pressure.

According to the fifth aspect, when the pressure in the higher pressure-side filled tank reaches the first predetermined pressure, the pressure in the lower pressure-side filled tank becomes lower by the second predetermined pressure than the first predetermined pressure. Therefore, for example, by setting the first predetermined pressure and the second predetermined pressure to "a pressure enabling the pressure rise rate of the higher pressure-side filled tank to be maintained in the reference pressure rise rate, it is possible to suppress the time until the supply of the fuel gas into the higher pressure-side filled tank is completed from becoming longer or the supply of the fuel gas from ending halfway.

As a sixth aspect, in the first aspect or in the second aspect, in a case where at the time of starting the supply of the fuel gas into both of the first filled tank and the second filled tank, the filled tank on the higher pressure side is defined as a higher pressure-side filled tank and at the time of starting the supply of the fuel gas into both of the first filled tank and the second filled tank, the filled tank on the lower pressure side is defined as a lower pressure-side filled tank, the control device sets the pressure rise rate of the higher pressure-side filled tank to be lower than the reference pressure rise rate so that a pressure in the lower pressure-side filled tank and a pressure in the higher pressure-side filled tank reach a target completion pressure as a pressure for stopping the supply of the fuel gas at the same time.

According to the sixth aspect, the pressure in the lower pressure-side filled tank and the pressure in the higher pressure-side filled tank reach the target completion pressure (pressure for stopping the supply of the fuel gas) at the same time. Therefore, for example, in a case where a difference between the pressure in the first filled tank and the pressure in the second filled tank is small, the pressure in the higher pressure-side filled tank and the pressure in the lower pressure-side filled tank can reach the target completion pressure at the same time. As a result, the adjustment width of the pressure rise rate (degree of lowering the pressure rise rate) can be made small, and the fuel gas can substantially equally be supplied into the higher pressure-side filled tank and the lower pressure-side filled tank.

As a seventh aspect, in any one of the first aspect to the sixth aspect, in a case where at the time of starting the supply of the fuel gas into both of the first filled tank and the second filled tank, the control device determines presence/absence of a change of a pressure rise rate in accordance with the pressure in the first filled tank and the pressure in the second filled tank.

According to the seventh aspect, it is possible to determine whether or not the pressure rise rate is made lower than the reference pressure rise rate, in accordance with the pressure in the first filled tank and the pressure in the second filled tank. Therefore, for example, in a case where the difference between the pressure in the first filled tank and the pressure in the second filled tank is larger than a predetermined value, the pressure rise rate of the first filled tank or the pressure rise rate of the second filled tank is made lower than the reference pressure rise rate, and in a case where the difference between the pressure in the first filled tank and the pressure in the second filled tank is equal to or less than the predetermined value, the pressure rise rate of the first filled tank and the pressure rise rate of the second filled tank can be kept to be the reference pressure rise rate. It should be noted that in a case where the difference between the pressure in the first filled tank and the pressure in the second filled tank is equal to or less than the predetermined value, the pressure rise rate of the filled tank on the higher pressure side may be lower than the reference pressure rise rate so that the pressures of both of the filled tanks respectively reach the target completion pressure at the same time.

As an eighth aspect, in any one of the first aspect to the seventh aspect the accumulator includes a plurality of accumulators and is a common multistage accumulator connected to both of the first gas supply path and the second gas supply path.

According to the eighth aspect, when the fuel gas is supplied into both of the first filled tank and the second filled tank from the multistage accumulator, the pressure rise rate of the filled tank on the lower pressure side can be lower than the reference pressure rise rate so that the fuel gas is not supplied into "both of the first filled tank and the second filled tank" from "one accumulator of the multistage accumulator". Particularly, when the pressure in the first filled tank and the pressure in the second filled tank are high, in other words when each pressure of both of the filled tanks is close to target completion pressure, the pressure rise rate can be lower than the reference pressure rise rate so that the fuel gas is not supplied into both of the first filled tank and the second filled tank from one accumulator (high pressure accumulator) of a plurality of accumulators in the multistage accumulator. That is, by making the pressure rise rate of the filled tank on the lower pressure side lower than the reference pressure rise rate, the fuel gas cannot be supplied into both of the filled tank on the higher pressure side and the filled tank on the lower pressure side from one accumulator (high pressure accumulator). As a result, it is possible to suppress the time until the supply of the fuel gas into the filled tank on the higher pressure side is completed from becoming longer or the supply of the fuel gas from ending halfway.

It should be noted that the above-mentioned embodiments are explained in such a manner that the filling object includes a first filled tank disposed in a first vehicle and a second filled tank disposed in a second vehicle, but, not limited thereto, for example, the filling object may include a first filled tank and a second filled tank (a plurality of tanks) mounted within a vehicle body of a first vehicle (or a second vehicle) without mentioning.

It should be noted that the embodiments of the present invention are explained, but the present invention is not limited to the above-mentioned embodiments but contains various modification examples. For example, the above-mentioned embodiments are in detail explained for easy understanding of the present invention, and the present invention is not necessarily limited to those provided with all the components as explained. In addition, part of the components in each of the embodiments can be subject to addition, deletion or replacement of the other component.

The present application claims the priority based upon Japanese Patent Application No. 2021-033609 of the application dated on Mar. 3, 2021. All the disclosure contents including the specification, the claims, the Figures and the abstract in Japanese Patent Application No. 2021-033609 of the application dated on Mar. 3, 2021 are by reference incorporated in the present specification as a whole.

DESCRIPTION OF REFERENCE NUMERALS

1: HYDROGEN GAS FILLING DEVICE (GAS FILLING DEVICE)

2: MULTISTAGE ACCUMULATOR (ACCUMULATOR)
3: HYDROGEN FUEL SUPPLY SYSTEM
5: DISPENSER UNIT
7: FIRST GAS SUPPLY PIPELINE (FIRST GAS SUPPLY PATH)
8: SECOND GAS SUPPLY PIPELINE (SECOND GAS SUPPLY PATH)
9: INTEGRATED CONTROL PANEL (CONTROL DEVICE)
25A: FIRST FILLING HOSE (FIRST GAS SUPPLY PATH)
25B: SECOND FILLING HOSE (SECOND GAS SUPPLY PATH)
51: FIRST VEHICLE
52: SECOND VEHICLE
53: FIRST FILLED TANK
54: SECOND FILLED TANK

The invention claimed is:

1. A gas filling device comprising:
a first gas supply path for supplying fuel gas into a first filled tank from an accumulator in which the fuel gas is accumulated;
a second gas supply path for supplying the fuel gas into a second filled tank from the accumulator; and
a control device configured to control a pressure rise rate of the fuel gas to be supplied via the first gas supply path into the first filled tank and control a pressure rise rate of the fuel gas to be supplied via the second gas supply path into the second filled tank, characterized in that:
when supplying the fuel gas into both of the first filled tank and the second filled tank from the accumulator, the control device sets a pressure rise rate of the first filled tank or a pressure rise rate of the second filled tank to be lower than a reference pressure rise rate in accordance with a difference in pressure between the first filled tank and the second filled tank.

2. The gas filling device according to claim 1, wherein the reference pressure rise rate, when the fuel gas is supplied into only one filled tank of the first filled tank and the second filled tank from the accumulator, includes a pressure rise rate of the one filled tank.

3. The gas filling device according to claim 1, wherein the control device sets, in a case where the pressure rise rate of one filled tank of the first filled tank and the second filled tank is lowered from the reference pressure rise rate, when the supply of the fuel gas into the other filled tank is completed, the pressure rise rate of the one filled tank to be the reference pressure rise rate.

4. The gas filling device according to claim 1, wherein in a case where at the time of starting the supply of the fuel gas into both of the first filled tank and the second filled tank, the filled tank on a higher pressure side is defined as a higher pressure-side filled tank and at the time of starting the supply of the fuel gas into both of the first filled tank and the second filled tank, the filled tank on a lower pressure side is defined as a lower pressure-side filled tank,
the control device sets the pressure rise rate of the lower pressure-side filled tank to be lower than the reference pressure rise rate so that a pressure in the lower pressure-side filled tank reaches a target completion pressure later by a predetermined time to the time when a pressure in the higher pressure-side filled tank reaches a target completion pressure as a pressure for stopping the supply of the fuel gas.

5. The gas filling device according to claim 1, wherein in a case where at the time of starting the supply of the fuel gas into both of the first filled tank and the second filled tank, the filled tank on a higher pressure side is defined as a higher pressure-side filled tank and at the time of starting the supply of the fuel gas into both of the first filled tank and the second filled tank, the filled tank on a lower pressure side is defined as a lower pressure-side filled tank,
the control device sets the pressure rise rate of the lower pressure-side filled tank to be lower than the reference pressure rise rate so that when a pressure in the higher pressure-side filled tank reaches a first predetermined pressure, a pressure in the lower pressure-side filled tank becomes lower by a second predetermined pressure than the first predetermined pressure.

6. The gas filling device according to claim 1, wherein in a case where at the time of starting the supply of the fuel gas into both of the first filled tank and the second filled tank, the filled tank on a higher pressure side is defined as a higher pressure-side filled tank and at the time of starting the supply of the fuel gas into both of the first filled tank and the second filled tank, the filled tank on a lower pressure side is defined as a lower pressure-side filled tank,
the control device sets the pressure rise rate of the higher pressure-side filled tank to be lower than the reference pressure rise rate so that a pressure in the lower pressure-side filled tank and a pressure in the higher pressure-side filled tank reach a target completion pressure as a pressure for stopping the supply of the fuel gas at the same time.

7. The gas filling device according to claim 1, wherein in a case where at the time of starting the supply of the fuel gas into both of the first filled tank and the second filled tank,
the control device determines presence or absence of a change of a pressure rise rate in accordance with the pressure in the first filled tank and the pressure in the second filled tank.

8. The gas filling device according to claim 1, wherein the accumulator includes a plurality of accumulators and is a common multistage accumulator connected to both of the first gas supply path and the second gas supply path.

* * * * *